US010188938B1

(12) United States Patent
Lotzer

(10) Patent No.: US 10,188,938 B1
(45) Date of Patent: *Jan. 29, 2019

(54) ACTION OR POSITION TRIGGERS IN A GAME PLAY MODE

(71) Applicant: OPEN INVENTION NETWORK LLC, Durham, NC (US)

(72) Inventor: Carey Leigh Lotzer, Sachse, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,154

(22) Filed: Oct. 15, 2017

Related U.S. Application Data

(63) Continuation of application No. 13/178,819, filed on Jul. 8, 2011, now Pat. No. 9,789,392.

(60) Provisional application No. 61/362,812, filed on Jul. 9, 2010.

(51) Int. Cl.
| | | |
|---|---|---|
| A63F 13/04 | (2006.01) | |
| A63F 13/213 | (2014.01) | |
| A63F 13/67 | (2014.01) | |
| H04N 9/31 | (2006.01) | |
| G06F 3/01 | (2006.01) | |
| A63F 13/40 | (2014.01) | |
| A63F 13/837 | (2014.01) | |
| A63F 13/90 | (2014.01) | |
| A63F 13/428 | (2014.01) | |
| H04L 12/64 | (2006.01) | |
| G03B 33/08 | (2006.01) | |
| G03B 37/04 | (2006.01) | |
| H04N 13/366 | (2018.01) | |

(52) U.S. Cl.
CPC ............ *A63F 13/213* (2014.09); *A63F 13/40* (2014.09); *A63F 13/428* (2014.09); *A63F 13/67* (2014.09); *A63F 13/837* (2014.09); *A63F 13/90* (2014.09); *G06F 3/017* (2013.01); *H04L 12/6418* (2013.01); *H04N 9/3147* (2013.01); *H04N 9/3185* (2013.01); *G03B 33/08* (2013.01); *G03B 37/04* (2013.01); *H04N 13/366* (2018.05)

(58) Field of Classification Search
CPC combination set(s) only.
See application file for complete search history.

(56) References Cited

U.S. PATENT DOCUMENTS

| | | | | |
|---|---|---|---|---|
| 4,843,568 A | * | 6/1989 | Krueger | G06F 3/011 345/632 |
| 5,454,043 A | * | 9/1995 | Freeman | A61B 5/1121 345/419 |
| 5,495,576 A | * | 2/1996 | Ritchey | G06T 17/00 345/420 |

(Continued)

*Primary Examiner* — Tsung-Yin Tsai

(57) ABSTRACT

A method, apparatus and non-transitory computer readable medium that, in one embodiment, interprets a user motion sequence comprises beginning a session, capturing the user motion sequence via a motion capturing device during the session, processing, via a processor, the user motion sequence into a predetermined data format, comparing the processed user motion sequence to at least one predetermined motion sequence stored in a database and determining whether to perform at least one of interpreting the user motion sequence as a universal command and registering the user motion sequence as a new command.

20 Claims, 20 Drawing Sheets

(56) References Cited

U.S. PATENT DOCUMENTS

| | | | | |
|---|---|---|---|---|
| 5,594,469 | A * | 1/1997 | Freeman | G05B 19/106 |
| | | | | 345/157 |
| 5,616,078 | A * | 4/1997 | Oh | A63F 13/06 |
| | | | | 345/156 |
| 5,617,312 | A * | 4/1997 | Iura | G06F 3/011 |
| | | | | 345/157 |
| 5,638,300 | A * | 6/1997 | Johnson | A63B 24/0003 |
| | | | | 473/223 |
| 7,000,200 | B1 * | 2/2006 | Martins | G06F 3/017 |
| | | | | 382/190 |
| 7,042,440 | B2 * | 5/2006 | Pryor | A63F 13/02 |
| | | | | 345/158 |
| 7,598,942 | B2 * | 10/2009 | Underkoffler | G06F 3/017 |
| | | | | 345/158 |
| 7,834,846 | B1 * | 11/2010 | Bell | G06F 3/011 |
| | | | | 345/156 |
| 9,542,002 | B1 * | 1/2017 | Lotzer | H04N 9/3147 |
| 9,751,004 | B1 * | 9/2017 | Lotzer | H04N 9/3147 |
| 9,789,392 | B1 * | 10/2017 | Lotzer | A63F 13/213 |
| 2005/0210417 | A1 * | 9/2005 | Marvit | G06F 1/1613 |
| | | | | 715/863 |
| 2005/0212751 | A1 * | 9/2005 | Marvit | G06F 1/1613 |
| | | | | 345/156 |
| 2011/0262002 | A1 * | 10/2011 | Lee | G06F 3/017 |
| | | | | 382/103 |
| 2012/0120060 | A1 * | 5/2012 | Noda | G06F 3/017 |
| | | | | 345/419 |
| 2012/0159290 | A1 * | 6/2012 | Pulsipher | G06K 9/00369 |
| | | | | 714/819 |

* cited by examiner

ACTION OR POSITION TRIGGERS IN A GAME PLAY MODE

CROSS-REFERENCE TO RELATED APPLICATIONS

This application is a continuation of U.S. application Ser. No. 13/178,819, titled ACTION OR POSITION TRIGGERS IN A GAME PLAY MODE, filed on Jul. 8, 2011, now issued U.S. Pat. No. 9,789,392, issued Oct. 17, 2017, and claims the benefit of prior filed U.S. Provisional Application Ser. No. 61/362,812, filed on Jul. 9, 2010, incorporated herein by reference.

FIELD

The present application is related to enhancing the player's gameplay experience by providing the ability to interact with the player without the use of a game controller and producing items which the player wishes to interact with or experience inside the game. In addition to this, the present application has the ability to virtually coordinate the motions and cooperative movements of multiple players, for example, in a team versus team effort, etc. even though one or more of these players may be geographically remote. Furthermore, the present application has the ability to interpolate and extrapolate a reasonable resulting motion instruction from a capable range of one or more motions made by the one or more players involved in a game.

BACKGROUND

Current console-based gameplay systems make use of hand-held controllers to provide the player with the capability to control a game experience. The game setup or player progression through the game allows the player to choose objects which they wish to interact with or use. Current console-based gameplay systems, however, do not allow a player to make use of or experience items within the gameplay which they do not actually physically possess.

SUMMARY

The current application enables the player to make use of or experience items within the gameplay which they do not actually physically possess. The actions, movements, expressions, etc. of the player incites the gameplay logic to chose the intended object and render it on the screen as if the player was holding the object. For example, this could be a tennis racket, a baseball bat, football, gun, bazooka, car, boat, bicycle, and any other items of an unlimited sort within the context of the given game in which the player is involved within.

Once a game has been started and the one or more players are participating in the game, the game has the ability to receive inputs from the one or more camera equipment whereby a software process runs to determine what the one or more players are doing and where they are doing it within one or more given relative gameplay coordinate systems which relate to one or more real-world coordinate systems.

In a particular embodiment of the current application, the player, for example could act as if they are hoisting a bazooka up on their right arm and ready to fire. If they point their arms in a particular direction and jolt it back and forth, this could be interpreted by the software process to be the player hoisting and firing a bazooka in a particular direction. In the resulting screen images of the game being played, the avatar would correspondingly hoist a bazooka and fire the gun in the direction pointed to by the player based on captured trajectories from the camera equipment using triangulation methods. As changes are made to adjust heights and trajectory, the avatar would respond in like manner within the context of the current game.

Using the bazooka example, the game system first detects motion from the one or more players' movements. The movements are recorded using the camera equipment and the images are transmitted to the game system. Once the game system receives the one or more images, which can be converted to an array of data points, it compares the data points to one or more data points stored in the game system database. If one or more matches for the data point sequences are found, this is considered a motion instruction. When one or more motion instructions are found, the game system reads the corresponding actions for the motion sequence from the game system database and executes any one or more commands attributed to the action. In this example, the data points generated by the player hoisting and "firing" the bazooka are compared to the data points in the database. This data points sequence generates a motion signature. The motion signature is a "light" interpolated mathematical grouping of points which can be easily compared to others within a system. This greatly reduces the amount of storage space required to contain the information, makes the information easy and quick to compare with other signatures and also allows for differing amounts of "loose" comparisons. The loose comparisons are important because multiple motions from one person to another person or from one time to another time may not be the same and yet, the player may want the general motion to be accepted as the motion of intent. For example, one player may not hoist an imaginary bazooka in the same way as another player might, but both may want the motion instruction to make their avatar's bazooka appear and be fired.

Moreover, the extrapolation angle of the bazooka, for example, might dictate the angle of trajectory. The system, having a known propulsion capability of the bazooka, coupled with the angle, can determine the trajectory path and its expected payload delivery point.

A catalog of signatures could be generated and stored so that the next time that the player repeats the action within the given game, the avatar responds without the software program needing to completely digitize and perform the full signature analysis needed the first time the player performs the motion. In this manner, the system learns the motions of the player corresponding to a certain avatar motion.

Conversely, the current application must detect the difference between a player pointing their finger at the screen in the shape of a gun in a battle or a player wanting to modify a setting on the screen, for example. This is done by context and may require one or more previous universal motions to place the command into a setting mode. In order to do this, there may be preceding one or more motion instructions which delineate the act of a battle motion from a setting motion such as waving the hands in an arc to make the two sets of motions different. In this way, the game system can distinguish between the two motion instructions even though one motion instruction may contain one or more motions which are the same or similar.

The process by which the current application receives input, analyses the input and responds with a given output collectively forms the current application.

Special hand signals, for example, may be used to perform specific interactions with the game console which are reserved as universal commands throughout the games being played. For example, if a player raises their right hand resembling a traffic cop stopping traffic, the game console could interpret this action as the player wanting the game play to pause where the player may have additional options available. The game console could then instruct the game to pause and process any additional instructions accompanying the recorded motion instruction. The duration, general direction and format of the signal form the components constructed from the motion instruction by the game console software which are used to communicate the command to the game console and/or game software. If the signal does not meet the required elements needed to form the intended signature, it is interpreted as some other action, as a new action, or ignored.

If a new game is played by the one or more players and the command action is not a universal command, one or more of the same commands can be used to produce different results. For example, in the bazooka example, one game may be a war game where a battle is raging and another game, using the same motion instruction, could be a pool party where a player is lifting a large beach ball. The same motion instruction can be shared by both games, but mean different things and manifest themselves in very different ways. However, universal commands, such as pausing the game, are not distinguished from game to game as these transcend game context and are accessible by the system at the game console level and not, necessarily, at the game software level.

DETAILED DESCRIPTION

Modern gameplay generally includes having a hand-held game controller to select one or more game-object selections and or one or more commands from one or more players either before or during a game.

The current application makes use of input devices such as one or more cameras and motion detection apparatuses to detect player movements which symbolize the addition or use of one or more devices within the context of a game.

Figure 1:
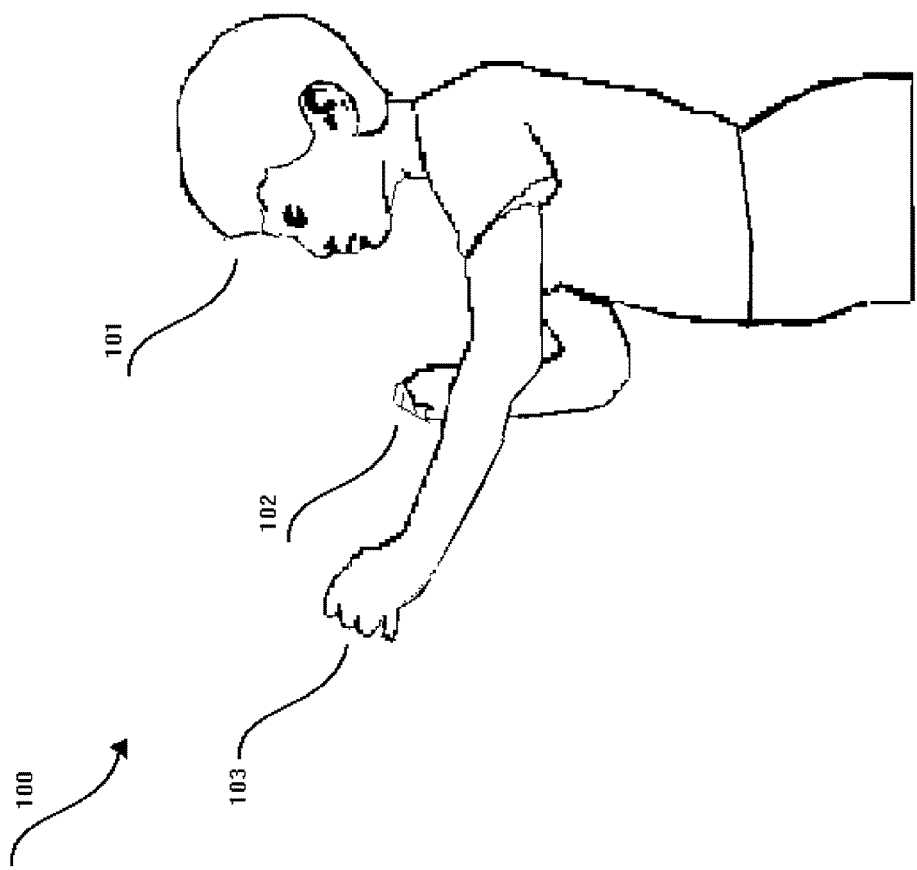
FIG. 1 shows a player holding a pretend bazooka in his hands.

Referring to FIG. 1, the player 101 within a play area 100 hoists and rests a pretend bazooka on their arm while holding the trigger 102 and aiming the gun in a particular direction 103 (used in a system 100 of the instant application, not fully shown).

Figure 2:
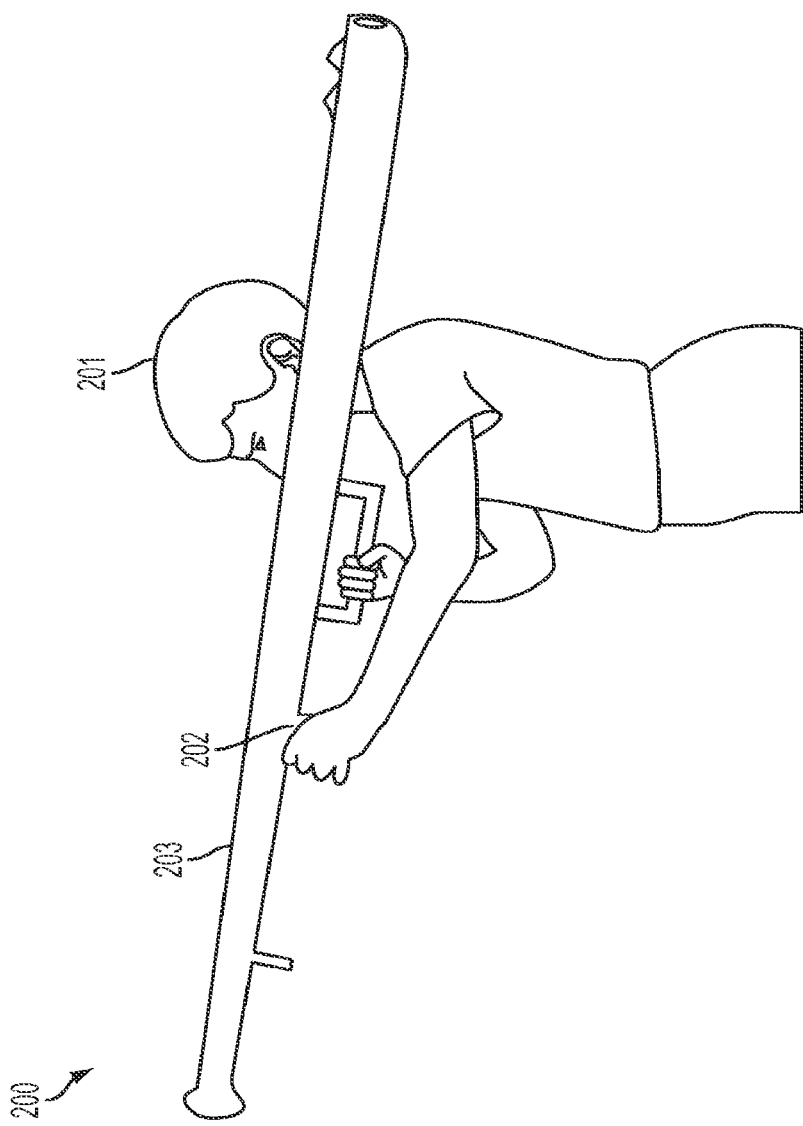
FIG. 2 represents the avatar corresponding to the player holding a bazooka and using it in the same manner as the player shown in FIG. 1.

Referring now to FIG. 2, the game 200 shows the player's avatar 201 holding a realistic bazooka by the trigger 202 and pointing the gun in the same direction 203 which is determined by the player. The notion is that the player in FIG. 1 is mimicked in FIG. 2 by the act of hoisting an invisible, albeit, pretend object into the air. In doing so, the game system records the images captured by the camera, converts them into vector signatures and compares the vector signatures to a catalog of vector signatures already stored in the system which have related results associated with them. In the example shown in FIG. 2, the game system, not shown, has compared the information generated by the game system in FIG. 1, not shown, and has found a corresponding motion instruction with a bazooka. The result of the match is shown in FIG. 2 where the avatar, appearing in the game, hoists the bazooka into the air at the same angle and position as the player shown in FIG. 1 and begins shooting the bazooka as instructed by the player through ongoing motions or corresponding motion instructions (used in a system 200 of the instant application, not fully shown).

The game camera, connected to the game console, first detects a motion made by the player within the context of the game. The game context refers to the genera of the game and what one or more items are most likely to be used with the game. For example, if the game being played is a baseball game and the player appears to be holding a bat, the game software can place a virtual bat in the player's avatar's hand mimicking the player's position, stance and bat placement.

Once the motion has been detected by the camera, the one or more images are sent to the game console processor which can convert the one or more images into to one or more sequences of vector signatures. These vector signatures represent the special relationship between the many positions of the player against a catalog of allowable items which the player may be pretending to use.

Figure 3:
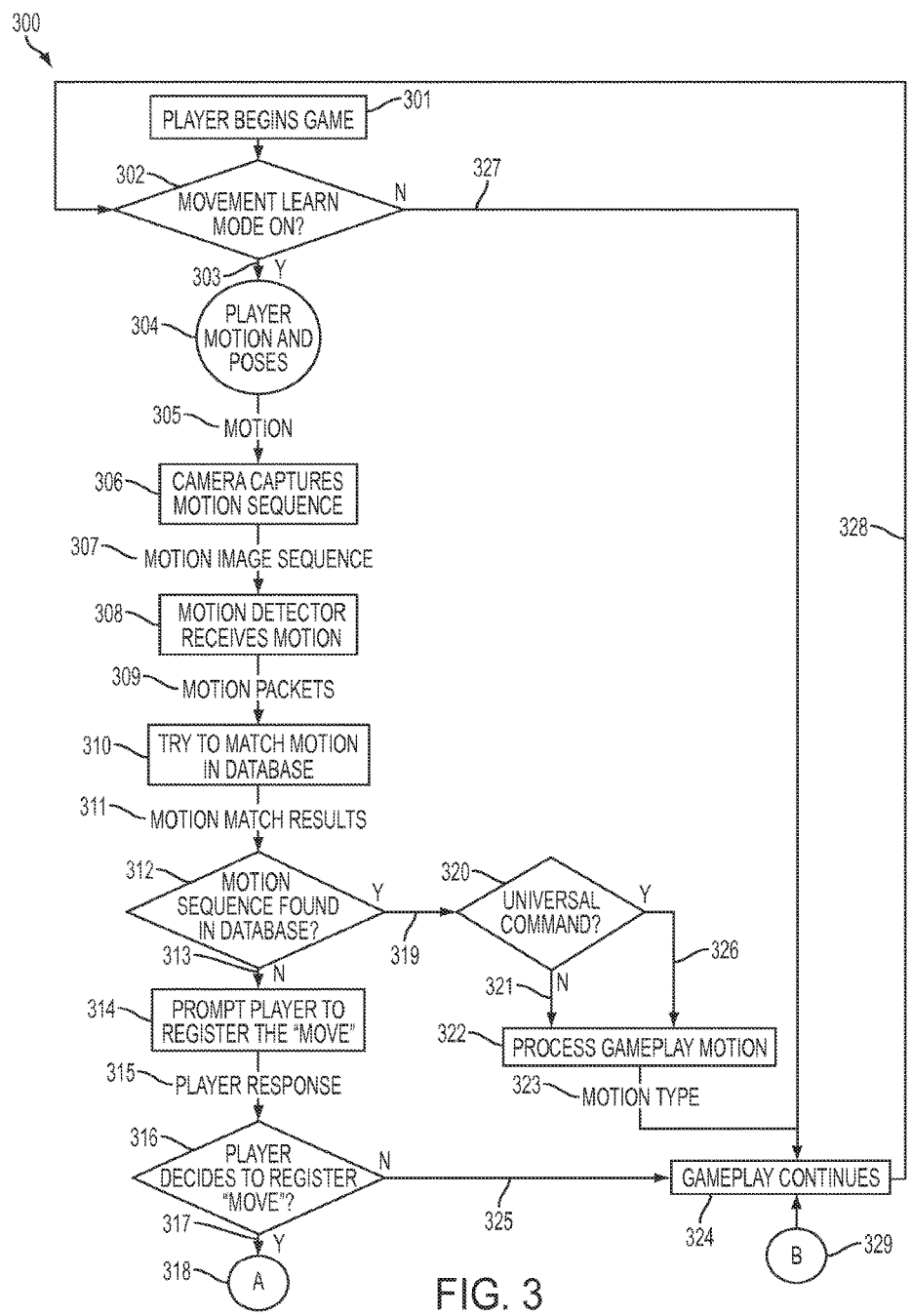
FIG. 3 represents the first portion of the logic used to register a new motion instruction.
Figure 4:
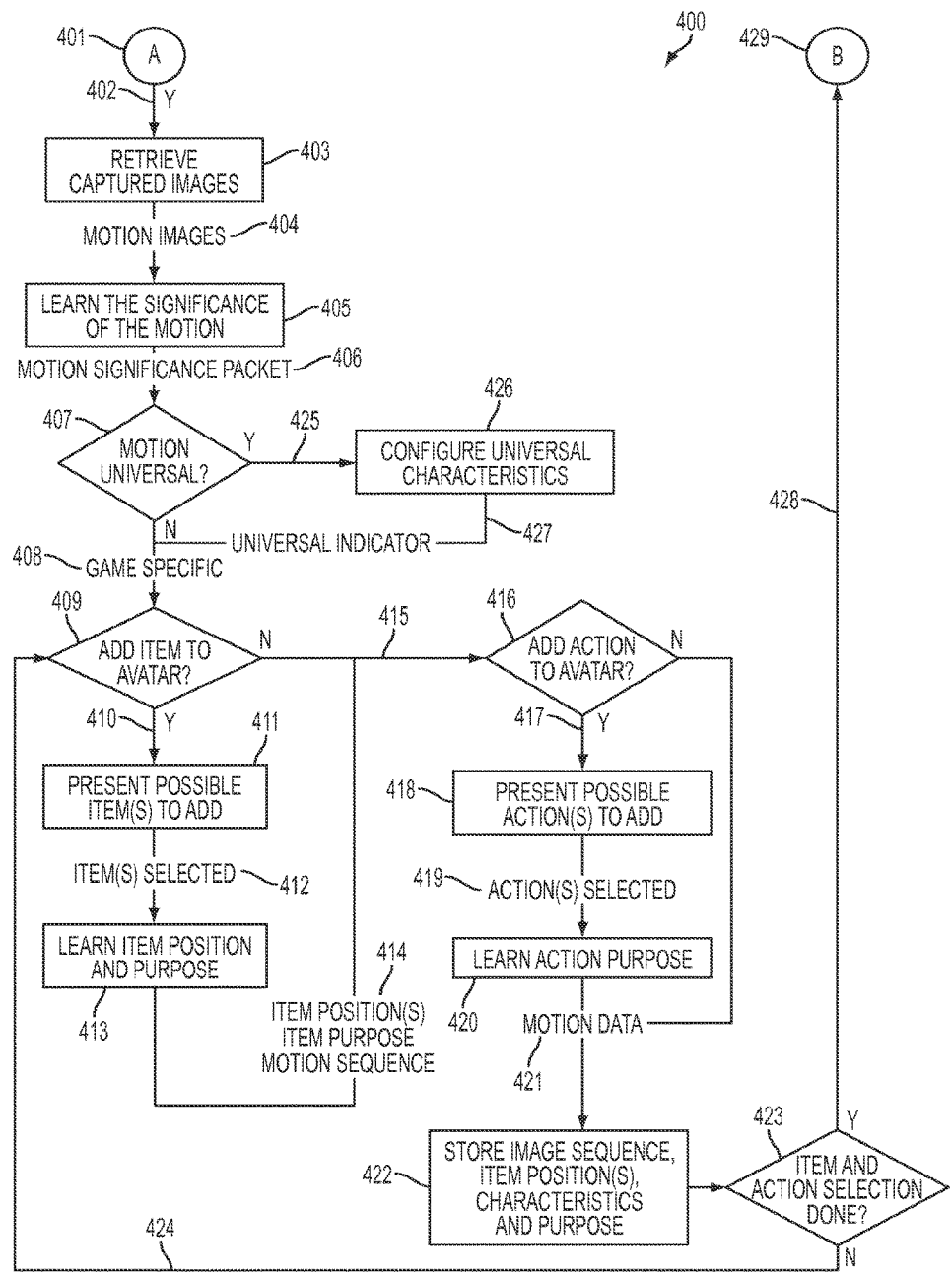
FIG. 4 represents the second portion of the logic used to register a new motion instruction.

Referring now to FIG. 3 and FIG. 4, the logic process 300 and 400 are shown. The player may begin the game play 301 and may choose, for example, to have the motion learning mode on or off 302. If the motion learning mode 302 is turned off, the path 327 can be followed and the motion can be ignored as normal gameplay continues 324 (used in systems 300 and 400 of the instant application, not fully shown).

The learning mode can allow the game console program to learn moves, pose and stance combinations and associate these with one or more gameplay commands or gameplay related items. The commands can either be tagged by the player as universal, which would be understood for all games and could even be used when the game software is not running, or specific to one or more games. For example, if the game being played is a baseball game, and a player makes a stance like they are holding a bat, the system could interpret this and represent the result as the player wearing their favorite team jersey, standing next to a home plate, waiting for the pitcher to throw a ball. The game console would then paint objects on the screen which would immerse the player in the environment associated with that interpreted command. This interpretation can be left to the capabilities of the game software, or could be dictated in detail by the player and recorded in a prior learning mode session. In the case described, for example, the game console could produce a ballpark, showing a pitcher ready to throw a ball toward the batter, standing next to home base, with a cheering crowd, a virtual score board, and other opposing players, potentially other teammates on bases, ready to run, etc. All of the items and players specified could appear on the screen as a result of the described stance by the player in the room. The other players shown on the screen to the player in the room, for example, could be virtual or real based on their individual involvement, stance, and availability. Real players could join in the game at any time. If real players, for example, do not occupy the positions required for the game, virtual players could be put into their places. The pitcher, in this example, could not only be virtual, they could also be a real live player, playing as the opposing team's pitcher, located in a remote location from the batter, connected to the player's game console playing as the batter by a network connection. The player playing the batter in the game could see the pitcher on their own screen from their own vantage point and the player playing the pitcher could see the batter on their own screen from their own vantage point.

If the batter misses the ball, both the pitcher and on-lookers might see the ball passing by the batter at the same moment from their own vantage points based on their screen reference. Observers that have chosen the pitcher's vantage position could see the ball pass by the batter from the pitcher's vantage point, but may also ask the system to show the play from another angle and vantage point. Likewise, observers that may have chosen to view the plays from the batter's vantage point could see the ball pass by the batter from the batter's vantage point, but may also ask the system to show the play from another angle and vantage point.

Conversely, the same stance described in one game for a batter in a game of baseball could be used to hit a piñata, for example if the game software was based on a party context. This is considered a game-specific motion instruction which could be directly based on the context of the game. If the system is confused by either an incomplete motion instruction or a seemingly intended motion instruction which does not fit within the given range of motion of the particular player or the current game being played, the system may prompt the player to determine if they intended to perform the action or if the system can decide what it needs to do on its own or use a default.

Motions based on player movements then holding still or posing for a few seconds, for example, can be recorded by the video intake system and analyzed by generating vector signatures for the images, creating a group of edge data points and comparing the edge data points with existing edge record groups in the database. A motion can be based on a group of physical movements, for example, by the player's face, fingers, arms, legs or body.

Once the player motion stops and the player freezes for a pre-determined number of seconds, for example, this could be used to tell the gaming system that the motion has stopped and can now be converted and stored as an instruction sequence. This combination of movements, ending with a stance, could form the motion instruction. The motion instruction could then be equated with one or more objects, movements or other commands associated with the player's character, the avatar, within the game context. Then each time the game software detects this same motion instruction, the item (i.e., bazooka, bat, car, motorcycle, etc.), movement (i.e., leaping, running, throwing, shooting, flying, etc.) or other command result could either appear on the screen with the avatar or be performed by the avatar, or by the system.

The movements necessary for the system to differentiate commands one from another can be natural motions which the system can detect in a unique manner. In the learning mode, the capture frame rate may be very high so that the motion detail can be captured and the vector signatures and edge points may be derived by interpolation functions which may be used in order to provide not only the edge point signatures, but flexibility in the player's variances from time to time in speed, position and posture even when the motion instruction is performed repeatedly or even incompletely. For example, the player can be required to perform the same general motion in order to instruct the avatar to hold a bat, but the player may not always be facing the exact same direction as they were facing when they stored the original motion instruction. In addition, the player may not move in the exact same manner, with the same speed the system recorded the original motion instruction. Therefore, a set of tolerances can be factored into the matching software so that the differences in the angle, speed, relative distance, posture and motion of the player can be taken into consideration as well as derived by the speed of the player's movements. For example, the speed of a football being thrown may be based on either the stored speed or the actual speed the player is moving their arm.

The motion instruction can be stored in the game system database with the associated result (one or more items, movements, and/or commands) and retrieved from the database using the same motion instruction. This is called the motion registration. Movements and combinations of movements can be as simple or complex as the player wishes and the results can, likewise, be as minor or extreme as the player dictates. In this manner, a single, simple action could result in a very complex, detailed and lengthy reaction played out by the avatar.

At anytime during the learning or registration process, the system may ask the player for more information if the system needs clarification by presenting prompts on the screen, waiting for an answer which could include multiple choice questions or drop-down responses which the player responds to the unit using one or more hand, arm or body movements and/or combinations with vocal commands. One example would be when a motion or programmed reaction is so subtle that the system is unable to discern a motion instruction one from another and needs clarification to make the discernment. Once it has determined the difference between the two, it may register the one or more differences in the game console.

The portion of the system which can prompt the player for further information and can formulate the one or more questions and interpret the one or more answers is called the system response handler.

Universal commands can be simply defined as commands which can be used anytime during gameplay with any game. Example universal commands could be invoked if the player wanted to pause the game they are in the middle of playing, continue, modify an option, modify a motion instruction, advance to another portion of the game, change a game or system parameter, change the speed of the game, etc. The universal command could be understood by each game to mean the same thing even though the universal command may be unique to the player and the player's gaming system, although the system could come equipped with several pre-determined universal commands available to the player. The motion instructions in this category could be considered universal game command assignments. In addition, the universal command could be unique to the game player's system as well as widely available or shared on one, more or all systems.

Unlike a universal command, the system can also store and retrieve specific game commands which are motion instructions related to the current game being played by the player and may not be recognized in another game being played by the same player in the same way. For example, a skiing game could contain a motion instruction for a particular ski jump with a turn and special landing. This same motion instruction may not be found in another instance of the same game or the motion could be associated with a completely different motion instruction in yet another game. For example, the same motion instruction which was used for the special jump in the skiing game could be interpreted as a particular spike in a volleyball game, which could be a completely unrelated game, yet having a shared motion instruction with a different result. The motion instruction for this particular example could be considered a specific game command assignment.

To switch the learning mode on, the player could be required to make a pre-known, pre-determined motion which the system can expect or receive a manual controller setting. Once this motion has been made, the system can receive the motion, analyze it, convert it to first one or more vector signatures, then one or more edge records, compare it to one or more stored edge records, and begin the program for the learning mode. At this point, the screen may show an indication to the player that the learning mode has been switched on. During any portion of the learning mode session, any number of objects may appear on the screen as the player moves which appear to coincide with the context of the game in which the learning mode is being used.

While in learning mode, the system can continually receive, evaluate and store any given number of motion/stance/instruction combinations until a pre-determined motion is performed by the player to switch the learning mode off. The learning mode can be performed for each particular game the player chooses or from a global perspective where the motion/stance/instruction combinations learned and stored are considered universal—meaning that they are relevant to all games and the game console system.

If the motion learning mode 302 is turned on, the system can detect one or more motions, stances or poses 304, creating the resulting motion 305. The motion 305 is captured by the camera system 306, transforming the motion 305 into a motion image sequence 307, delivering the motion image sequence 307 to the motion detection unit 308. Receiving the motion image sequence 307, the motion detection unit 308 can transform the motion image sequence 307 into a series of one or more motion packets made up of edge points 309 and can send the one or more motion packets 309 to the receiving motion logic component 310. Receiving the one or more motion packets 309, the motion logic component 310 can attempt to match the one or more motion packets 309 against a dynamic database, transforming the one or more motion packets 309 into one or more motion match results 311, sending the one or more motion match results 311 to a database logic component 312. The database logic component 312, receiving the one or more motion match results 311, can determine if the motion has been previously registered with the system 319 or not 313.

If the one or more motion match results 311 have not been previously registered, the player can be prompted to register the motion packets 314 and have the one or more motion packets 309 added to the database, creating a player response 315 further processed by the response handler 316, or the motion could be simply matched to a similar action within the context of the motion, or the motion could default to a preset motion result.

If the response handler 316 receives an affirmation from the player response 315 to register the motion 305, the path 317 is followed joining FIG. 4 at connector A 318.

If the response handler 316 does not receive an affirmation from the player or a pre-determined time period expires, the gameplay continues 324 path is taken 325 returning to the motion receiving unit 302 along 328.

If the one or more motion match results 311 have been registered in the system database, path 319 can be followed and a decision can be made whether or not the one or more motion match results 311 make up a universal command 320. If the one or more motion match results 311 make up a universal command 320 the motion can be processed as a universal command 326 based on the items and actions attributed to the universal command assignments 322. Once the items and actions attributed to the universal command response 322 are satisfied, the gameplay continues 324. If the one or more motion match results 311 do not make up a universal command 320 the motion can be processed as a specific game command 321 based on the items and actions attributed to the specific game command assignments 322. Once the items and actions attributed to the specific game command response 322 are satisfied, the gameplay can continue 324.

Continuing now with FIG. 4 at logic sequence 400 from connector A 401 receiving the player's decision 402 to register the one or more new motion packets 309 and activating the receiving 403 of the captured motion images 404 by the significance learning module 405, producing a motion significance packet 406. This motion significance packet 406 can require attributes such as the command type, the one or more items within the command and the one or more actions of the avatar by the command. A logic module 407 can be used to ask the player if the command being registered through the motion significance packet 406 the type of command that will be registered. If the command is universal 425, it can be made available for retrieval from all games and configured with associated characteristics 426. This configuration 426 can produce a universal indicator 427 which can be stored with the registration.

If the command is not universal 408, it can be considered game-specific and may only be activated in the current game being played and registered in that game, or could be used in another game to mean something else. An example of this, again, could be the skiing game. When the motion used to make a ski jump could be repeated in another game to effect a different (or the same) result. Further one motion instruction in one war game, for example, resulting in a bazooka being lifted and fired, could result in yet another bazooka being lifted and fired in another war game without, necessarily, the player needing to be mindful of this and needing to program this motion instruction into their game system more than once or at all.

Likewise, as a portion of the registration process, one or more items and one or more actions may be attributed with the same registered motion.

The item prompt 409 can be used to generate an item packet 410 or to go on 415 to the add action prompt 416. If the item packet 410 is generated, the selection list of possible items 411 can be shown to the player. The player can select one or more items producing an item selection packet 412. The learn item position and purpose module 413, receiving the item selection packet 412, can combine the one or more item positions and purposes and motion sequence data 414 forming the item portion of the motion data 421.

Either by forming an item packet 414 or going on 415 to the add action prompt 416 the player can choose either to add an action 417 or simply finish the motion data packet 421 generation. If the player chooses to add an action 417, a list of possible actions 418 can be shown for the player to choose from, producing an action selection packet 419. The action selection packet 419 can further be used to generate the action purpose 419 and completing the motion data 421 with the action selected packet 419.

Receiving the motion data packet 421, the one or more image sequences, one or more item packets and one or more action packets, the system can store the one or more motion data packets 422 and can prompt for more items or actions 423 to attribute to the motion sequence being registered.

If the player is not finished adding items or actions to the motion sequence registration 424, the player can be prompted 409 for additional items or actions. If the player is finished 428 adding the desired items or actions the game can continue a connector B 429.

Once the player has finished allowing the system to learn new motion sequences, the learning mode option can be switched off and game play can continue as normal.

An alternative embodiment of the immediate application includes the game console's ability to learn one or more players' motions dynamically without the need for an explicit learning mode. In this embodiment, the system would interpret the motions of the players, relating them to motion instructions which have been learned by the system, associate the one or more motions to motion instructions which closely approximate the desired responses, simply copy the one or more players' actions, or interactively ask the one or more players how they wish the system or one or more avatars to respond.

For example, while one or more players are in the process of interacting with a game, the game system, having a game software on the game console, attached to one or more cameras, would receive one or more motions from the one or more players, convert the one or more motions to one or more vector signatures, compare the one or more vector signatures to the one or more stored vector signatures within the attached system database, either locally or remotely, attempting to locate one or more matches for the vector signatures by comparing the data points of the received vector signatures with the data points of the stored vector signatures. If a match or close match is found, the corresponding motions or action results for the matching one or more vector signatures are run using the system software.

If a match or a close match is not found for the one or more vector signatures, the system would read a set or default setting which would direct the system to perform one or more of the following tasks regarding the processing of the one or more vector signatures. In this respect, the system would either locate still another one or more vector signatures similar to the received vector signatures or run one or more motions or actions, copy the motions of the player and transmit these motions to the avatar, or simply ask the player in some manner, how they wish the avatar would respond. Once the response has been received by the system, it is stored in the system database, associated with the received vector signatures so that a second motion matching this newly stored one or more vector signatures would find this match and process the resulting motions or actions without prompting the player for instructions a second time.

The player also has the ability to share, trade, purchase and/or receive any number of motion instructions from a remote database. This can be considered to be a portion of the downloadable content available to the player. In this manner, the player can leverage the time, techniques and resources of other players across the network.

Providing an example scenario of a universal command assignment, the player could switch on the system learning mode by waving their hands, placing them on their head, and holding that position for several seconds. The system could interpret this motion instruction as the learning mode switch and could place the unit in the learning mode. At this point, the system could increase the camera capture frame rate and wait for motions and pauses from the player. To add, remove or modify a universal command, the player could start a motion instruction by spreading their arms out wide, for example, to let the system know that the player may be setting up a new universal command. The system could show a message on the screen stating that the system is ready to accept the new universal command. At this point, the player could produce a motion and pause. The system might then show a message on the screen stating that the motion instruction was accepted and to choose the related action from a list or to act out the remainder of the motion requested of the avatar and then have the option to further modify the resulting avatar action.

At the point where a decision by the player is to be made, the screen could show a drop-down box with any number of possible choices. The player could motion in the air to page up or down through the list or one-by-one, select a new list, clear out the motion instruction and start over, etc. Once the player has chosen one or more actions or items to associate with the motion instruction, the system can store the motion instruction and the result associated with it in the system database. The system can continue to accept additional motion instructions until the player performs a universal command to stop the learning mode, such as spreading their arms out and then moving them up over their head. At this point, the learning mode can stop and the player may use any of the motion instructions they stored in the system.

In addition to the ability for the player to influence the moves of their own avatar in a game, the system could also be used to analyze and mimic the player's moves and substitute or relay instruction back to the player regarding changes in their motion to improve their ability to play. In this manner, the game could instruct the player to change their motion patterns to better match the example patterns of the game's avatar.

For example, the avatar of a game could be a golf professional. The system console could record the player's moves and visually present the combined results of the player's moves on top of or beside the avatar's moves. In this manner, the overlay could be used to provide a precise instructive variance in the greatest angles or distances between each interesting frame of the avatar and player. As the player improves their golf swing, for example, the differences between the player's swing and the avatar's swing shrink as the player's ability and performance improves in the game as well as in the real world.

Yet another example could be a player practicing shot put techniques. Shot put professionals could be recorded; their motions stored on video and convolved into the system as avatar motions, for example, and could appear on the screen with the player's avatar. In this manner the player's avatar could be used to play-out the player's motions along side or overlaid by a transparent copy of the professional avatar. Once the player begins to throw the shot put, the professional avatar could also begin throwing their shot put in the same direction. The trajectory of the resulting throw could be shown and compared, along with the distance and power levels of the shot put. Then the player could review the videos of their throw along side the professional avatar's throw at different angles for further comparison.

The same relationship stated for the professionals described could be used for playing an instrument, conducting an orchestra, performing a craft or other activities.

The method in which this could be done could be based on one or more frames captured, first, by the professional, then saved to the system as edge points. The resulting edge points could be distributed with a software program on a media, a network, or some other method. The player could perform one or more moves which closely match the professional moves, resulting in a second sequence of edge points. When the second set of edge points are compared to the first set of edge points, differences could be analyzed, displayed, etc. so that the player can observe the comparisons and make adjustments in their motions, producing a third, or greater sequence of edge points, further comparing these edge points to the first or other set of edge points.

The resulting edge points from the professional could result, for example, in an avatar animation shown while the player is performing their motion, either side-by-side or as a transparent overlay. The option between the side-by-side view and the overlay could be automatic or directed by the player. In the case of the transparent overlay, the professional avatar animation could be processed by a filter which would produce a transparent output. The game system could seek particular key motions which could be used by the system to align the motion playback between the professional avatar animation and the player's motions.

The player could also progress through a series of increasingly more difficult levels where the professionals are improving as the player improves, etc.

Likewise, the same techniques could be used to introduce, remove or modify specific game commands. The player could place the system into learning mode, let the system know that they want to work on game-specific motion instructions by producing some related motion known by the system, and the player could be presented with a series of screen shots of game titles or play demo segments of games they have either played and/or purchased in the past. The player could scroll up and down or point at one or more games they wish to include. Using similar techniques described in registering universal commands, the player could introduce one or more motions then a pause, for example, and associate the motion instruction with one or more items and/or actions presented to them on the screen. Once the items and/or actions associated with the motion instruction are stored in the system, the player can either choose more games or exit the learning mode or perform other tasks.

Likewise, the present application can possess a given order of "grace" in measuring the motion speed, direction and specific range so that motions that are repeated from time to time, can result in the same intended one or more motion instructions without requiring the player to perform the motion instruction at exactly the same position in the room, using the exact same orientation, with the same distance and speed as the motion instruction was recorded at, and yet, producing the same intended resulting action or other motion derivative specified by the match found in the motion instruction database.

The process by which the grace or tolerance is introduced into the game system may be set either by a default setting or by the one or more players either through the use of a motion instruction, an audio instruction, or some other method. The tolerance setting may be made separately for none, one or more, or each of the motion speed, motion range, motion angles and other aspects of the program. If a motion speed tolerance is set and the received motion, for example, translates to one or more vector signatures which mathematically fall within a difference window along the plane of motion inside or equal to the speed tolerance, the vector signature is said to be inside the required motion speed and, thereby, can be said to be a match in motion speed. If the motion speed received, compared to the stored motion speed is outside of the motion speed tolerance, it is not considered a match and no further processing continues. Likewise, the same process is used for corresponding motion ranges, motion angles, and other motion aspects. In the case of motion ranges, for example, throwing a football, the stored motion has a specific motion range from a first football throw. Once a second motion based on a football throw is received by the system, the game system will search the system database for other vector signatures, comparing the motion ranges of each until a stored one or more motion ranges match the one or more received motion ranges. An example of the use of a motion angle tolerance could be explained, for example, where a player kicks a ball at a given angle, resulting in a first motion which is stored to the game system database, then the player kicks a ball at another time, producing a second motion and this second motion is physically at a different angle than the first angle. The second motion angle is either inside or outside of the first motion angle based on the motion angle tolerance. The same can be done for audio signatures.

Further, as collections of motion instructions may be grouped together, they may be stored and recovered, distributed or sold in some manner as a group, i.e., a teams playbook. In addition, these single or collections of one or more motion instructions may be made public or kept private where a player has the ability to subscribe or have automatic updates of motion instruction game packs or catalogs as they desire, subscribe to or purchase. In this manner, relative to the specific mass, height, agility, etc., of the player using the motion instruction, the downloaded update to the player's database could result in the motion instruction intended to by the creator of the motion instruction. For example, if a player A, who is 160 pounds and five-foot-six-inches downloads a friend's playbook for a football team, where the friend, player B, is 300 pounds, six-foot-10-inches, the motion instruction result, for example, throwing a football to a wide receiver, could result in throwing the ball a distance slightly less and a speed slightly slower than the player B that actually created the motion instruction, given the same motion, and yet, producing the same result of passing the ball that the original player, player B, intended when creating the motion instruction. Yet, in this example, player B not necessarily having any indication of the original speed, direction or result of the motion instruction player A created.

Likewise, if player A in this example used the appearance of more force and speed in throwing the football, the game system could take this into consideration and adjust the one or more results accordingly. For example, if the same player A used what appeared to be a faster throw than the motion instruction was created for, the game console could interpret this as a throw to the receiving player with more force and result in a longer throw, equal to or greater than the originally recorded motion instruction created by player B.

In this manner, the player A did not spend the time and effort to train their system to learn that motion used and resulting in passing the football, the player A just used the pre-recorded motion instruction. This can allow the player A and player B the ability to exchange, create, modify, purchase, etc. motion instructions from each other and for other players.

The process to produce a series of one or more edge points could be a part of the system of the instant application which has the ability to save, transmit, and/or receive available edge point content. The edge point content may not care what the avatar is when it is applied to the avatar. The content may be produced by a player producing the one or more motions required to produce the edge points. The edge points could be loaded on a server which can be accessed by members. Other members could sign into the system, search for the content they are looking for, purchase, download or share content they may have, for example, to swap for the player's content they are interested in. Once the other player's content has been downloaded to the system console, the software could read the content, save it into the system, allow the player to make changes to it, and use the content for their own avatar play-back.

Of course, this is a simplified example, where a simple motion instruction such as the passing of a football in a football game could already be stored in the game for the player to use and it might not necessarily be a requirement to create this, but it could leave the system wide open for the creativity of players and growing social networks to become additionally immersed in sharing, building and using the motion instructions in their own games.

Figure 5:
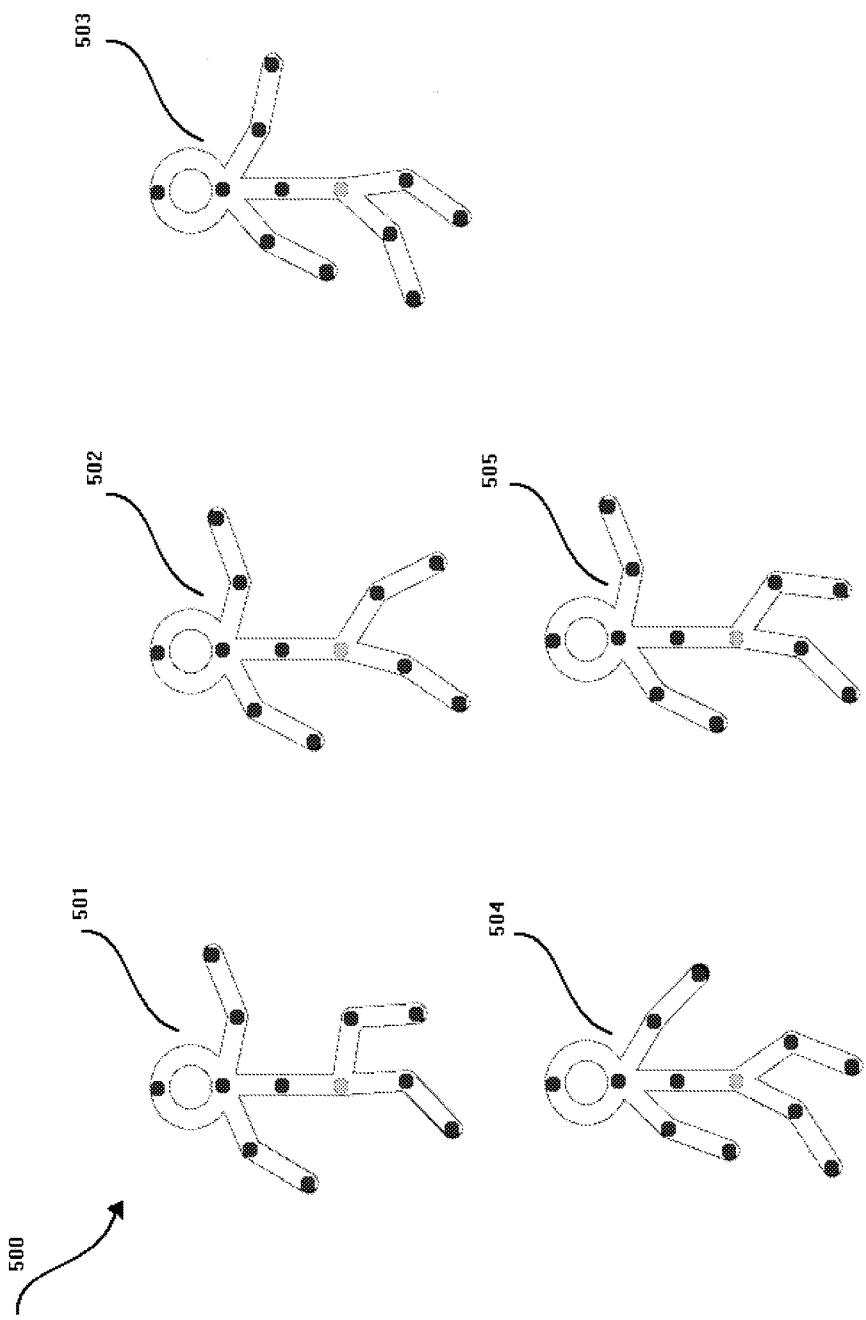
FIG. 5 represents a series of five example basketball dribble capture frames comprising body outlines and pivotal points.

Now, referring to FIG. 5, where a motion is being received into a unit in learning mode, for example, running while dribbling a ball, separate frames are captured into the system while the motion is occurring. System 500 describes an example embodiment of five frames each as 501, 502, 503, 504, and 505. Each of the described frames is collected for a motion. Many frames may be captured per second and some identical frames can be captured repeatedly as motions are repeated or other motions may be so slow that multiple frames are captured, whereas they can be dropped and later interpolated. As shown, the ball is absent from the frames as it is not captured in the real-world and can be interpolated by further mathematics not shown in this figure.

In addition, the number of points can be as few as three and as many as thousands. The higher number of points captured results in a more detailed subject translation. For example, the twelve points captured in 501 cannot describe changes in facial features or hand details. Multiple mathematical references and coordinate groups may be needed to learn more intricate motions thereby producing more intricate motion vectors. For example, a mathematical model may be used to generate the motion points of the hand while another mathematical model is used to generate the motion points of the body and still another for the face.

Furthermore, each of these motion points could exist on their own coordinate system, having various levels of precision unrelated to each other.

What the image in 501 does describe in this example is the body with arms and legs raised. Adding in 502, the arms are in the same place, but the legs have moved. Based on the distance that the legs have moved in relation to each other, it can be discerned that the person is running. In 503 the arms and legs have moved. The arm has been lowered relative to the frame shown in 502. Still, in 504, the person has lowered their arm and still running. Finally, in 505, the person is still running and raising their arm. In the context of a basketball game, the system can infer that the player is dribbling the basketball and is approaching a virtual basket. On the screen, the player can be moving the ball down the court at the same relative speed they are moving in the real world. The sequence of the described five frames would constitute the learned motion and be registered in the system as such. Once the player repeats this motion in a non-learning mode scenario within the given game context, the avatar may appear to be dribbling a ball down the court.

Other items of interest include the direction the player is running within a confined area relative to the unconfined space of a computer program. If a player, for example, must turn in their room, the system must determine that they are only turning in the same room but are still progressing in the same direction in the game. If, for example, they impede on a virtual boundary within the computer system and the person switches direction, the avatar on the screen can be inferred as changing direction, also.

Figure 6:
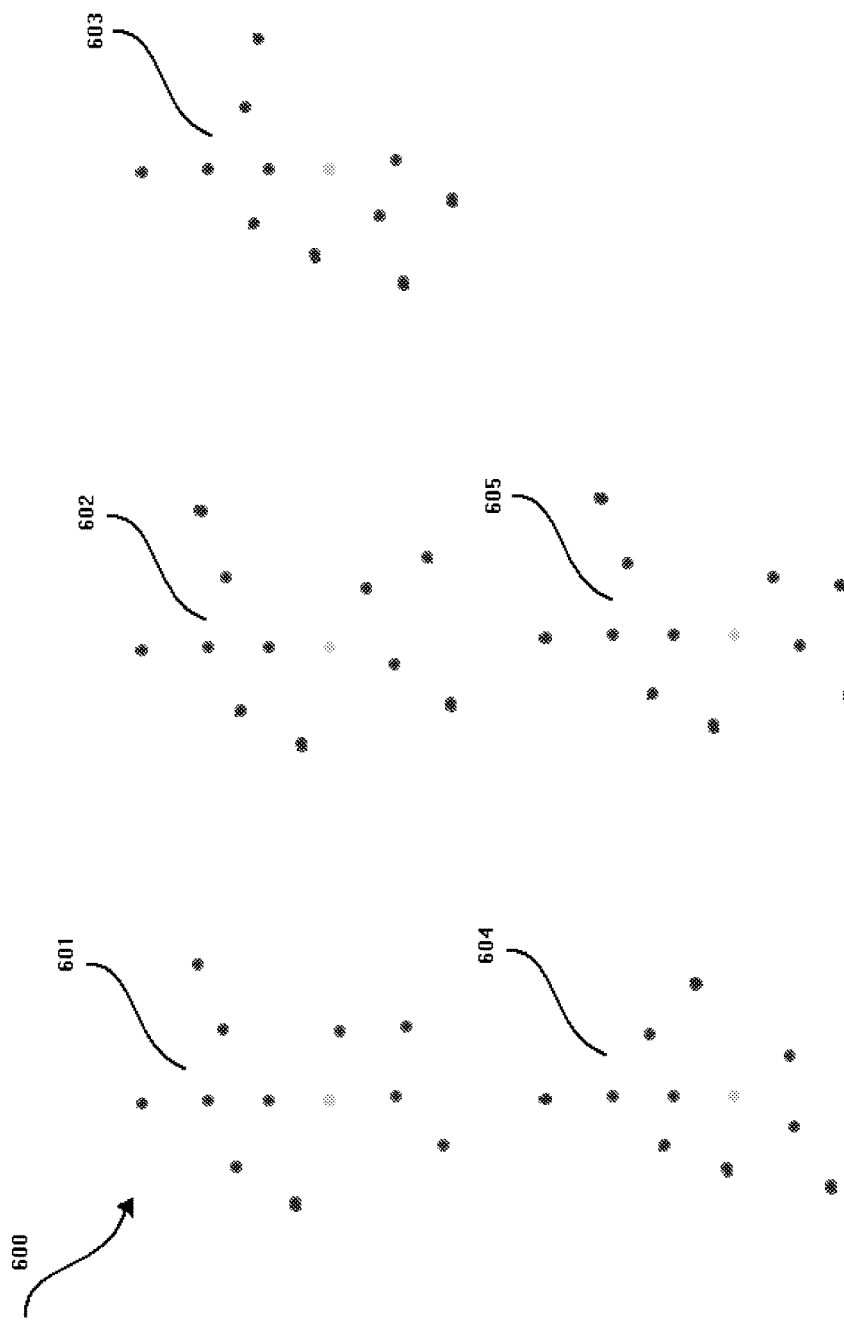
FIG. 6 represents the series from FIG. 5 where the pivotal points are extracted.
Figure 7:
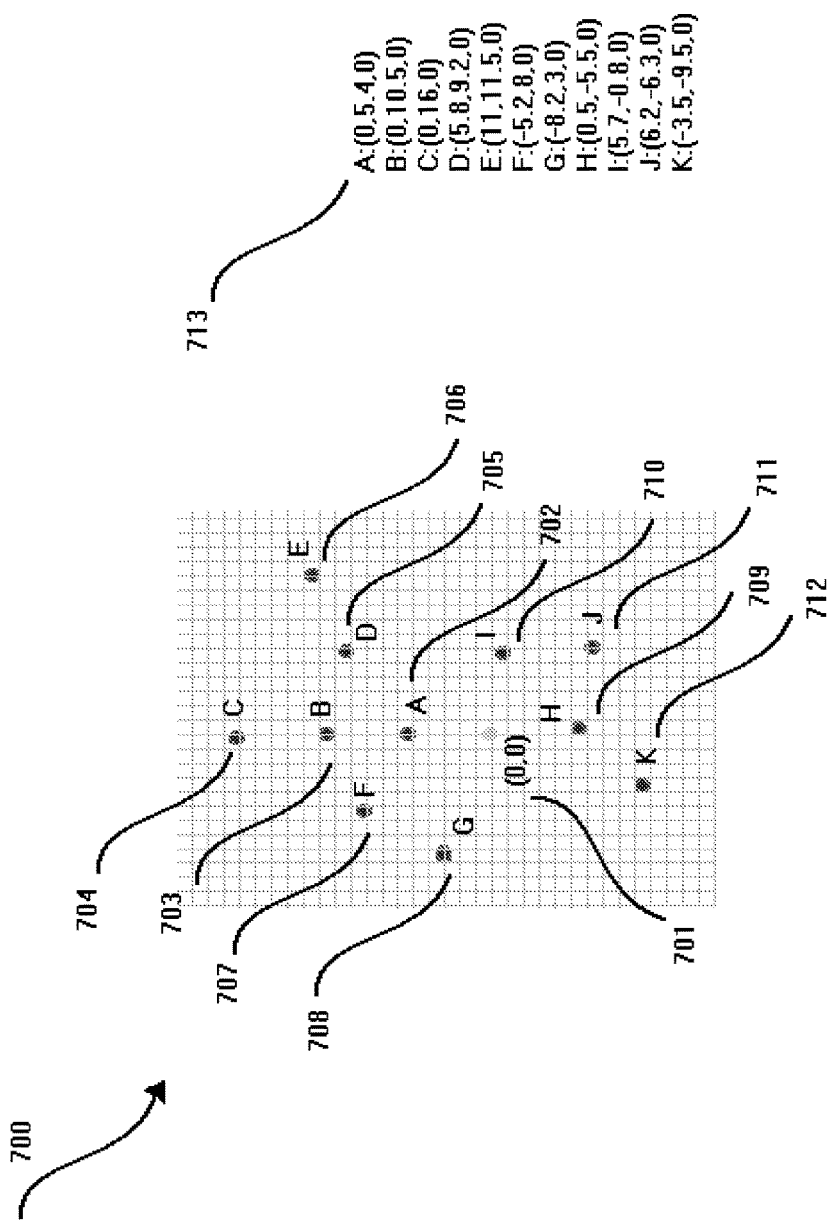
FIG. 7 represents the series from FIG. 6 where the first of the five pivotal point collections are superimposed on a coordinate system.
Figure 8:
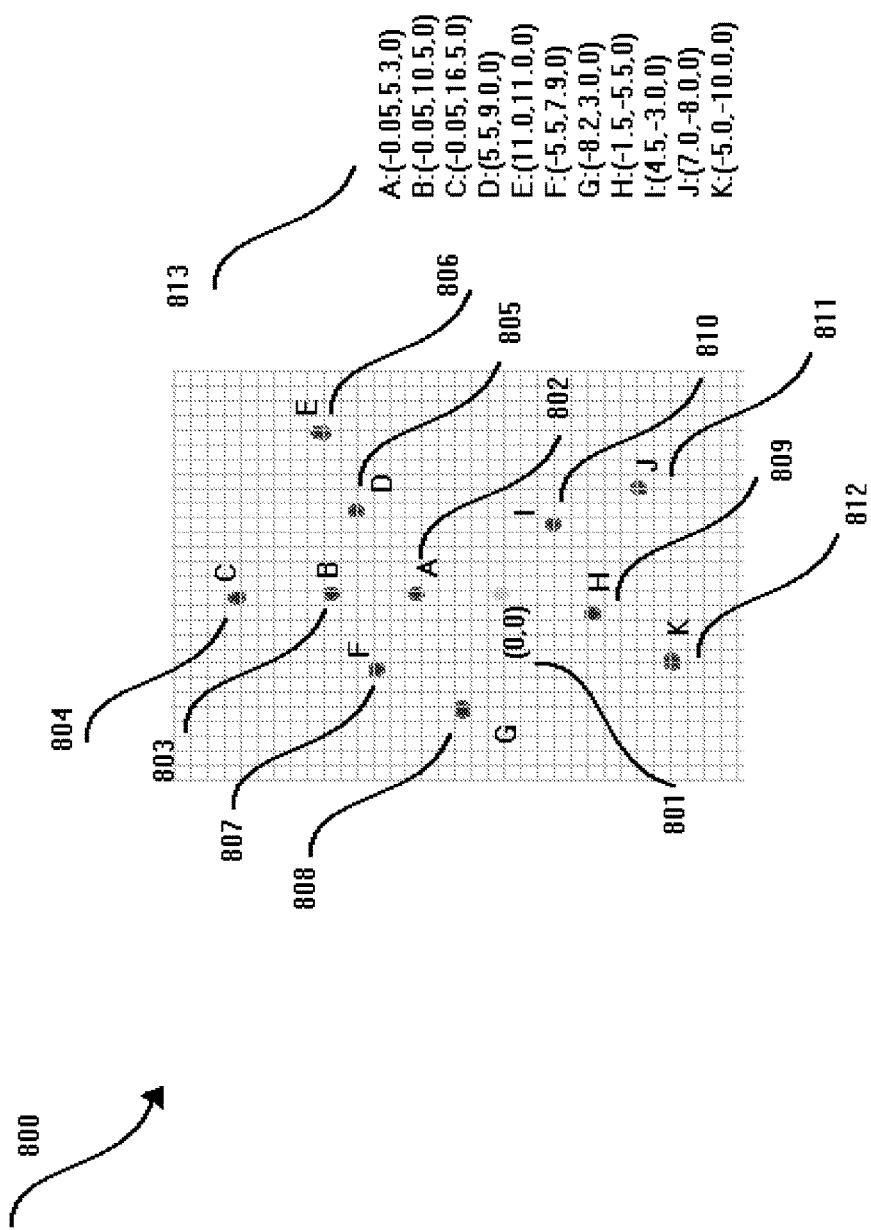
FIG. 8 represents the series from FIG. 6 where the second of the five pivotal point collections are superimposed on a coordinate system.
Figure 9:
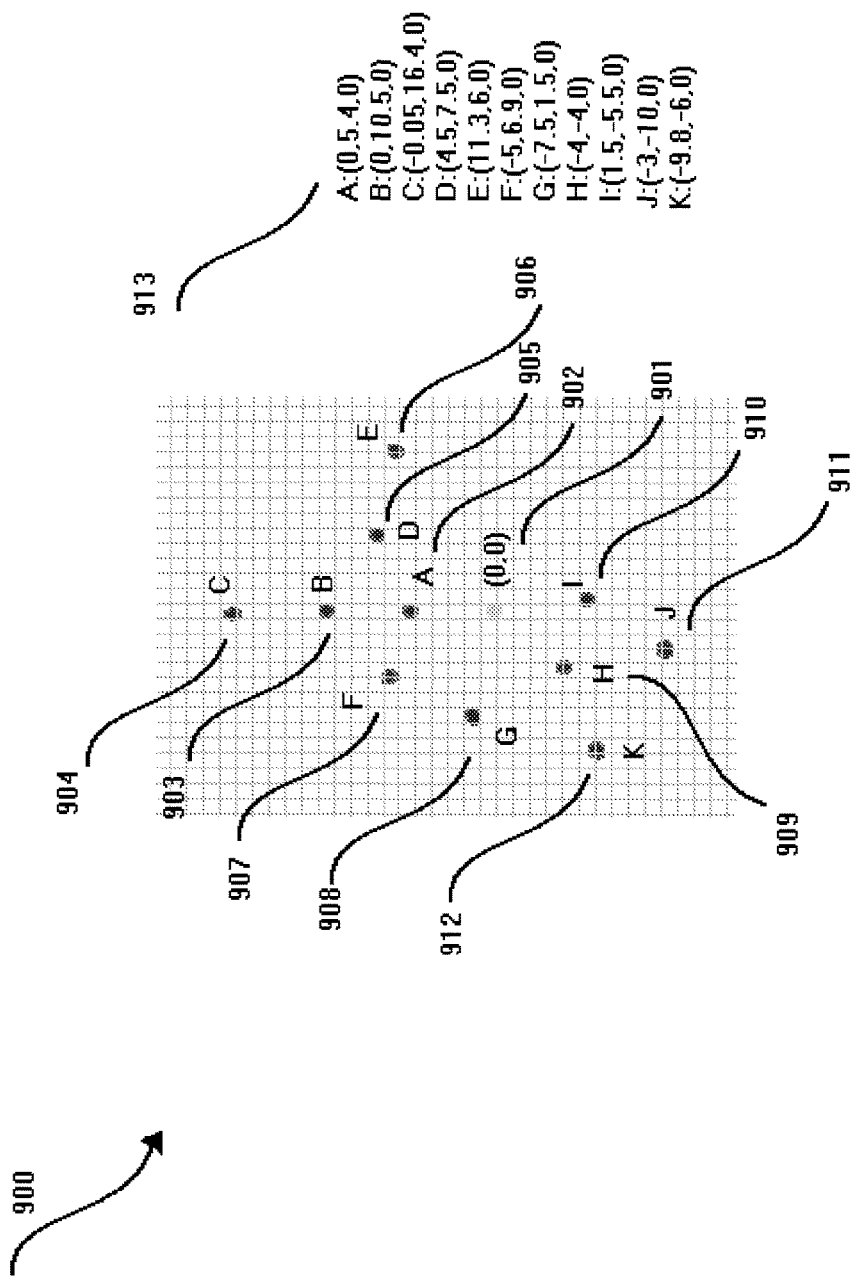
FIG. 9 represents the series from FIG. 6 where the third of the five pivotal point collections are superimposed on a coordinate system.
Figure 10:
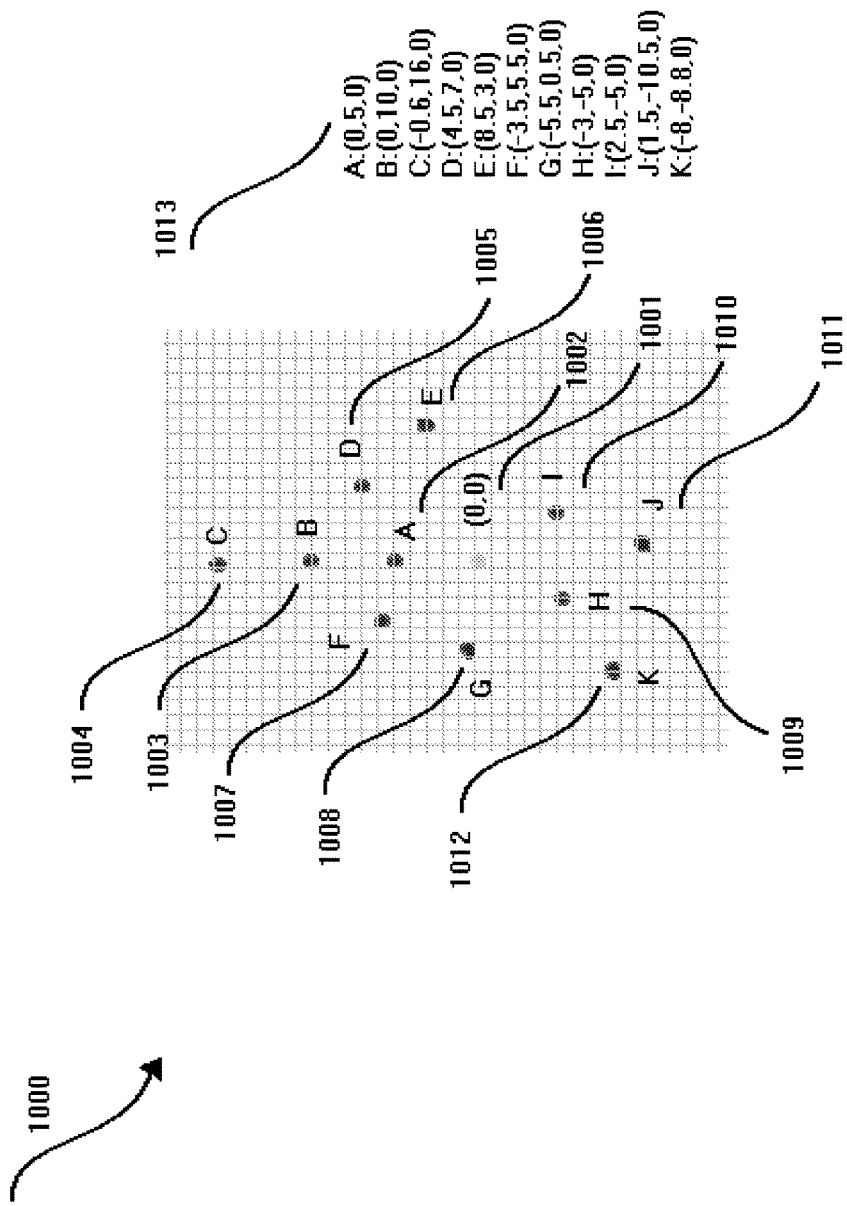
FIG. 10 represents the series from FIG. 6 where the fourth of the five pivotal point collections are superimposed on a coordinate system.
Figure 11:
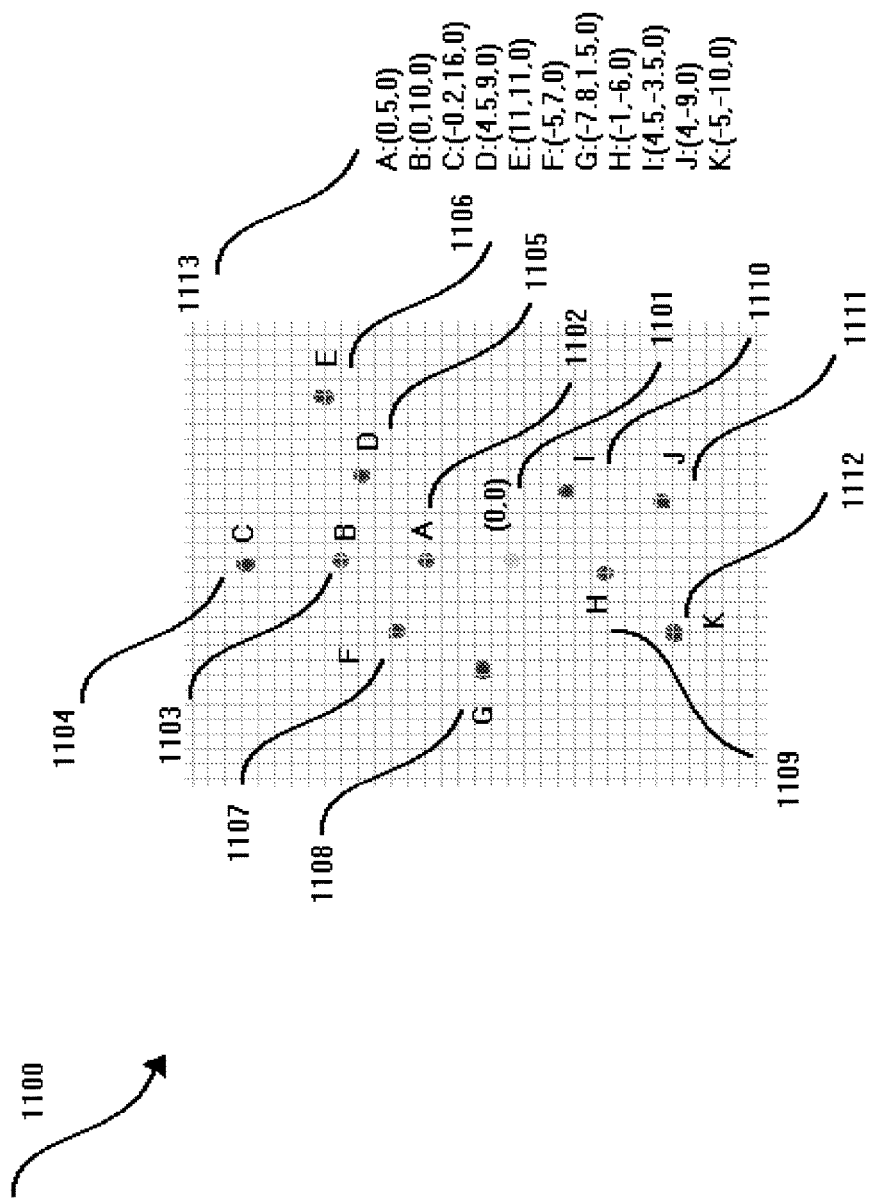
FIG. 11 represents the series from FIG. 6 where the fifth of the five pivotal point collections are superimposed on a coordinate system.

Referring now to FIG. 6, system 600 of the instant application not fully shown appears as several points taken from the captured objects from system 500. Frames 601, 602, 603, 604, and 605 represent the motion points captured from the learned motion. Later, these points, or close approximations, are captured in a non-learning mode during normal gameplay and compared to all of the groups of points previously captured in the learning mode until a match is found.

If a match is not found a configurable set of options may be performed. This can include the motion simply matched to a similar action within the context of the motion, the motion result defaulting to a present motion result, the player being prompted for the action they would like to take, or the motion simply processed as it is performed by the player.

In addition to the ability that the player can run and act like they are dribbling a ball, the system can be programmed during the learning mode to have the avatar run, dribbling the ball without actually requiring the player to be running. In this way, the speed of the avatar's run could be based on the speed of the dribble, for example.

In the same manner, a player without the ability to run, for example, could virtually run as they are directing their own, custom, avatar through other methods, such as moving just their hands or fingers. The motion of the hands or fingers could be related to the full body movement of an avatar on the screen. The way this might be performed would be based on the system learning the motions of the players' hands which they relate to certain movements made by the avatar. In another words, the player's hand could jump up into the air. In this way, if the system has recorded a hand jumping up into the air and it is related to the avatar jumping up into the air, the avatar would appear to jump up into the air on the screen based on the player's motions. The player's motions would be translated to motion frames, vector signatures, edge points, and then compared to the edge points stored in the game console's database. In this case, for example, a match would be found where the edge points for the avatar jumping up into the air would match, somewhat, the edge points produced when the player's hand moves up into the air. The match results in the avatar jumping up in the air on the screen and this is what the system uses to play out the player's motions.

Figure 12:
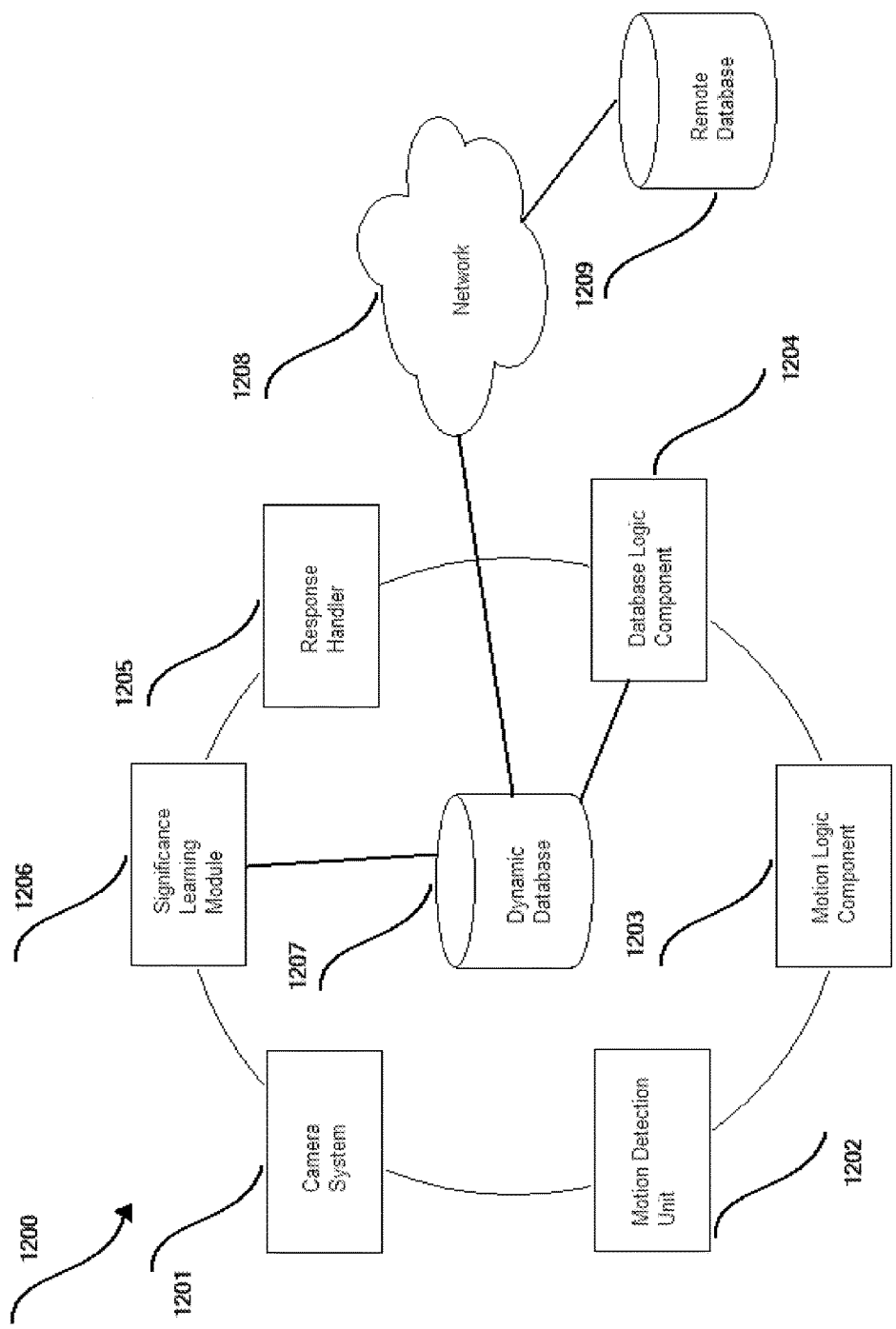
FIG. 12 represents a preferred embodiment of the structure of the advanced gameplay system.

The processes used to relate the motion instructions to the resulting items or commands in the game system are described in FIG. 12 where a motion instruction is captured by the camera system 1201, transforming the motion into a motion sequence, sending the motion sequence to the motion detection unit 1202. The motion detection unit 1202 converts the motion sequence into one or more motion packets, transforming the motion packets into vector signatures, the vector signatures being transformed into edge points, sending the edge points to the motion logic component 1203. The motion logic component 1203 receiving the edge points, forming a database query made up of the edge points, sending the database query to the database logic component 1204 where the database query is run against the database 1207, the database logic component 1204 receiving the query results from the database 1207, sending the results to the response handler 1205. The response handler 1205, receiving the results of the database query from the database logic component 1204, either prompts the player for more information, receiving the one or more responses from the player and/or sending the results of the motion instruction and/or the results of the player prompts to the significance learning module 1206. The significance learning module, receiving the information from the response handler 1205, stores the motion instruction and result in the database 1207.

In addition, each of the nodes described in FIG. 12 could be located in a single or multiple nodes, each of these being located either locally within the game system or outside of the game system on a network device, disk, chip, etc. over a wired or wireless connection.

At any time, the player may ask the system to store or retrieve additional motion instructions and/or updates from a network 1208 which is connected to a remote database 1209 which may include connections from many other players having the same ability to store and retrieve motion instructions and/or updates. The system can include a set of motion or audio instructions and can be updated from a server based on the universal instruction lists as well as motion instructions for a particular game the player has purchased. These updates can be made by system developers and may also be made by other players. In this manner, motion or audible instructions are not limited to players or system developers. The associated audio or motion instructions could be provided, for example, by professional quarterbacks. These could be uploaded, as an example, to a remote server and made available to players. Motion instructions which may appear to override custom motion instructions that the player has already produced on their system may result in a prompt which the player can answer. These updates can happen when the player first starts the system or in the background so that gameplay is not interrupted.

Players can also choose to have the system overwrite any potential conflicting motion instructions with the updates if they wish.

Likewise, in the same way that motion instructions are continually updated, the models for allowable ranges of motion are continually updated. So as range models improve over use and time, the details to these models are also updated in the player systems to improve the player's experiences. For example, if an improvement is made in a lateral snap where the quarterback can hide the ball for a second and toss it to a receiver, the original models for this may be crude or missing from the system so that the motion result is not available to the player for them to choose, then an update to the system could provide the system with the motion result the player wished to associate with the motion instruction in the first place.

Figure 13:
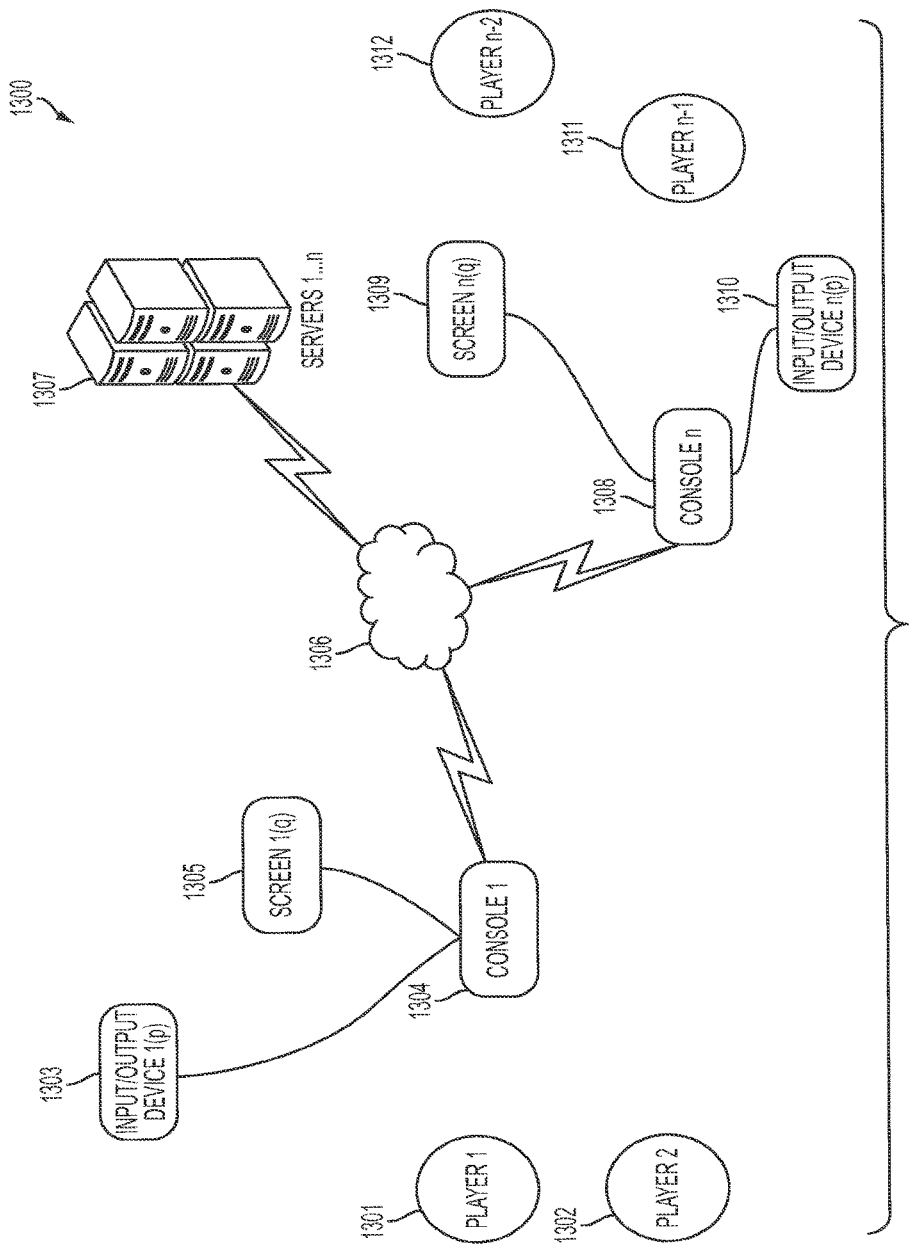
FIG. 13 represents an example network architecture of the advanced gameplay system.

Referring now to FIG. 13, gaming system 1300 includes multiple players, represented as the players 1301 and 1302 receiving and sending information to and from the input/output device 1303 connected to the console 1304 connected to a screen 1305 and a network 1306 where information can be shared, retrieved or stored at the server 1307.

In addition to the above, multiple players represented as player 1311 and player 1312 send and receive input from the input/output device 1310 connected to a console 1308 and a screen 1309 and a network 1306 where information can be shared, retrieved or stored at the server 1307 as well as interact with multiple players 1301 and 1302 across the network. Likewise, players 1301 and 1302 can interact through the input/output device 1303 with players 1311 and 1312 using their input/output device 1310.

In this scenario, if the players 1301, 1302, 1311 and 1312 are playing together in the same game, the screen interactions, avatars of the associated players, including the motion instructions for multiple players 1301 and 1302 could appear on the screen 1309 across the network for the multiple players 1311 and 1312 to view and interact with, and the avatars of the other players 1311 and 1312, as well as the motion instructions, could appear on the screen 1305 which is viewed by players 1301 and 1302.

Figure 14:
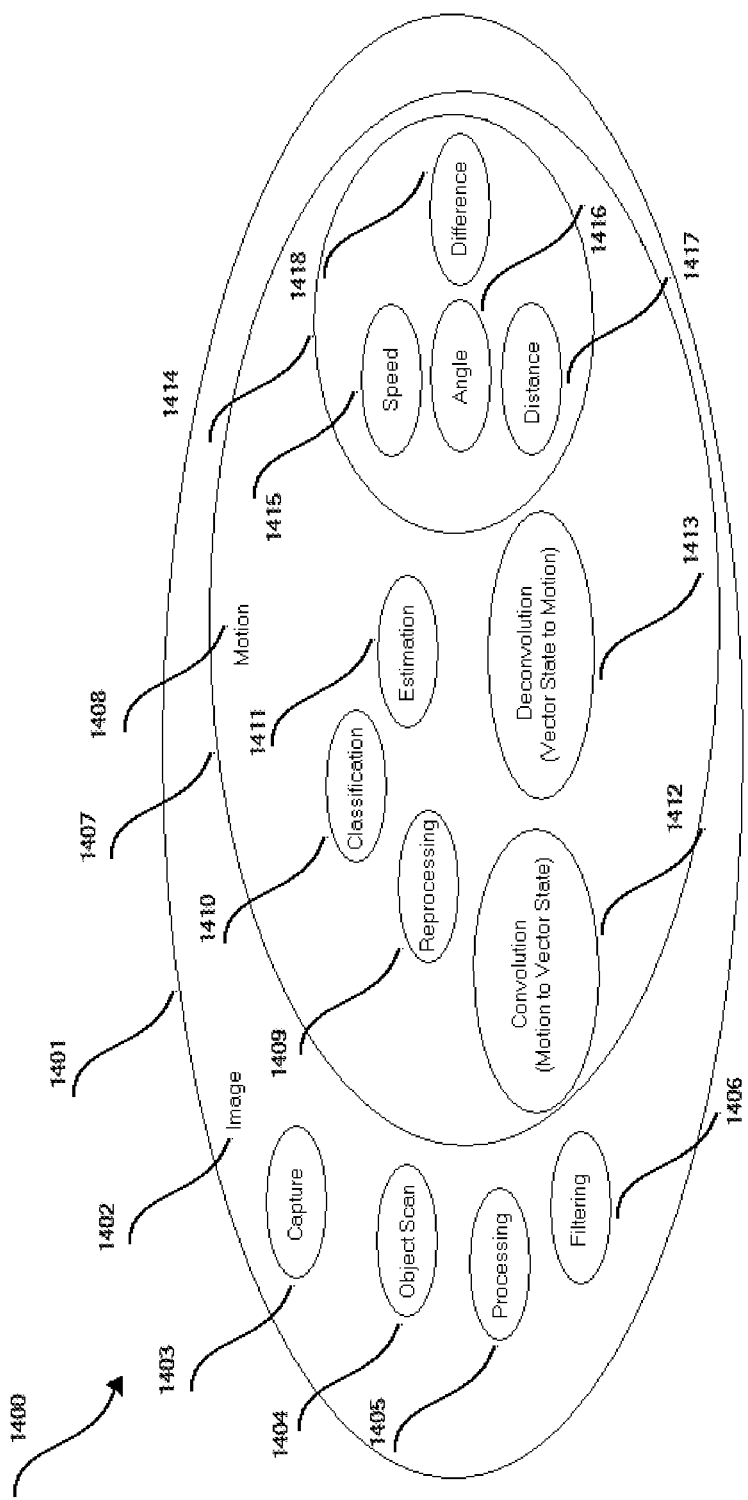
FIG. 14 represents the image and motion process software organization within the advanced gameplay system.

Referring now to FIG. 14, system 1400 of the instant application not fully shown appears as a series of related software processes residing within the game console system for the purpose of receiving images and translating these images into motion instructions or other related data for the purpose of playing a game, determining motion levels, storing and retrieving objects, modifying the system settings, etc. The image process 1401 and 1402 receiving the image data by the capture process 1403, receiving scanned objects through the object scan process 1404, receiving image data through the image processing module 1405 and filtering the processed image data through the filtering module 1406 resulting in the processed image data. The processed image data receiving one or more images by the motion process module 1407 and 1408, undergoing a preprocessing stage in the motion preprocessing module 1409 resulting in a processed motion sequence. The processed motion sequence received by the classification module 1410 which determines what information should accompany the motion sequence for further analysis, for example, needing to handle the motion through the learning module, etc. If several motion images are received, the motion estimation module 1411 may be able to determine the direction of the motion and provide additional information with the motion sequence which may be used by the system to determine how the motion sequence is to be handled. This may be done by producing, for example, interpolated vector sequences where it appears that motion vectors may be missing. Once the resulting motion sequences have been generated, they may be transmitted to the convolution module 1412 where the motion sequences are translated into vector signatures for the purpose of reducing the number of data points required to store the data. The vector signatures are produced through an algorithm located in the software of the game console which receives the image data and reduces the legs of the body, for example, to points from the joints at the hip joint to the knee to the ankle, forming a series of rays in three dimensions along a given three dimensional Cartesian coordinate system. The lines joining these points together are the vector signatures. The vector signatures are further reduced to a series of data points called edge points based on the end points of the vector signatures. As motion is demonstrated, the vector signatures, thereby edge points change within the space of their Cartesian coordinate system relative to each other, resulting in the recorded motion instruction. The reverse of taking a motion instruction so that it may be applied to an animated object, such as a player's avatar, is performed by the deconvolution module 1413. The process includes taking the stored edge points, producing vector signatures, and translating these vector signatures to the joints of the associated object. This could be an inanimate object such as a ball or tennis racket, even a coffee cup, or an animal of some sort, or the player's avatar, for example. Associated with the motion module 1407 is the information collected from the motion sequence which includes motion speed 1415, motion distance 1417, motion angle 1416, and motion differences 1418 used in comparing motion sequences. When trying to determine the motion result, the comparison module, not shown, requires the data from the speed module 1415, the distance module 1417 and the angle module 1416 so that motion sequences can be aligned in time with these data for the purpose of determining the associated match.

Figure 15:
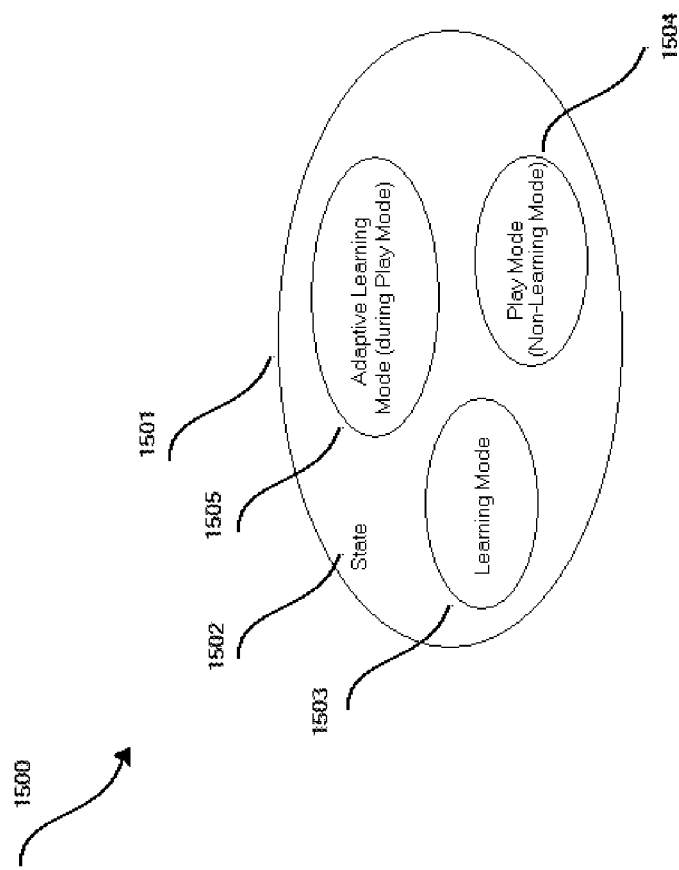
FIG. 15 represents the state process software organization within the advanced gameplay system.

Referring now to FIG. 15, system 1500 of the instant application not fully shown appears as a series of related software processes residing within the game console system for the purpose of running system processes based on the related system state 1501 and 1502. In some cases, the state 1501 will be based, and use the processing algorithms related to the learning mode 1503 where the one or more players interact directly with the game system for the purpose of learning motions and relating motions to resulting stored actions. At other times the system may run processes based on the play mode 1504 generally based on when one or more players are playing a game or interacting with the system in a non-learning mode capacity. This is demonstrated by a player, for example, playing a game without being interrupted or interacting with the system to determine the player's motion intentions. Still other times, the system may be in an adaptive learning mode 1505 where the system broadly infers the one or more player's intentions and subtly asks the one or more players for queues which aid the system in determining the player's intentions while the one or more players are playing the game. For example, a player may be playing volleyball and the player wants to dunk a ball, but they also want to add a fake move to the dunk. The player may make a motion which the game system has not seen before and the system shows that the ball was spiked but also places a prompt on the screen showing a caption such as "if this was not your intention, please wave your hands up and down so that I can make adjustments", or the system could actually speak this to the player and they could accept the motion without doing anything, as the default, for example, or they could instruct the system on how to make the adjustment based on their intention.

Figure 16:
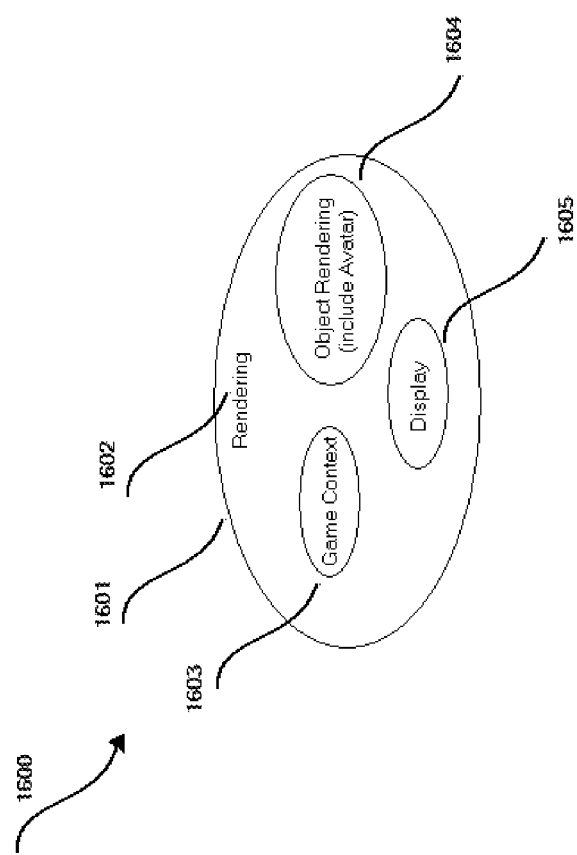
FIG. 16 represents the rendering process software organization within the advanced gameplay system.

Referring now to FIG. 16, system 1600 of the instant application not fully shown appears as a series of related software processes residing within the game console system for the purpose of rendering the images on one or more displays or other devices. These processes are intrinsically related to the hardware and/or one or more network connections coupled to the game console or attached equipment. The rendering module 1601 and 1602 include processes which deliver output based on the game context 1603, the object generation 1604 and the display interface to the attached hardware 1605. The game context 1603 can aid the system in determining the motion classification based on the type of game being played, especially for the purpose of rendering objects on the display or avatar motions when one or more similar motions are involved. For example, if a war game is being played and a particular object is intended to appear on the screen as a response to one or more motions by the one or more players, but the same motion is found in the system also related to another game context, such as a pool party, sport, etc., the difference between the two motions results in two or more different resulting actions or objects. The differentiating information is based on the game context where each game may have a specific context variable which the system uses to determine how motion results are to be formed for the corresponding game.

Figure 17:
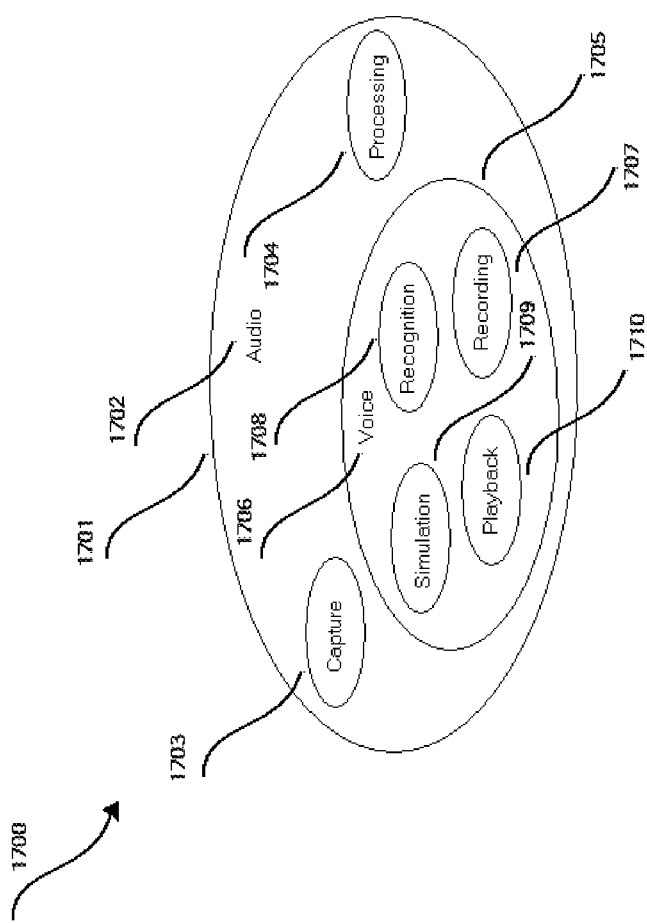
FIG. 17 represents the audio and voice process software organization within the advanced gameplay system.

Referring now to FIG. 17, system 1700 of the instant application not fully shown appears as a series of related software processes residing within the game console system for the purpose of receiving, processing and delivering audio signals. The audio module 1701 and 1702 contain several processes related to the capture 1703 and further processing 1704 of one or more audio streams. A subset of processes related to the audio module 1702 is the voice module 1705 and 1706 which contains the audio recording module 1707, the voice recognition module 1708, the voice simulation module 1709, and the voice playback module 1710. The audio recording module 1707 receives audio signals from the one or more players or objects and either stores the signals, interprets the signals as commands, or uses them in some other ways. The voice recognition module 1708 can be used to compare voice signals, for example, in the case of gaining access to secure areas, settings, or other information of the gaming system. The voice simulation module 1709 may be used to generate a voice signal using a filter. For example, a voice signal originally recorded using a female voice, could be reprocessed through a voice filter algorithm to sound like a male voice. This could be used in such a was, for example, as to save one voice on the game console system, but have its output filtered through one or more gender, inflection, vocabulary, etc. filters so that the output is delivered to the one or more players based on their preferences. The voice playback module 1710 may be used to deliver, for example, a voice instruction to the one or more players. This can be demonstrated by the system giving the player feedback such as for a golf swing, swimming stroke, etc.

Figure 18:
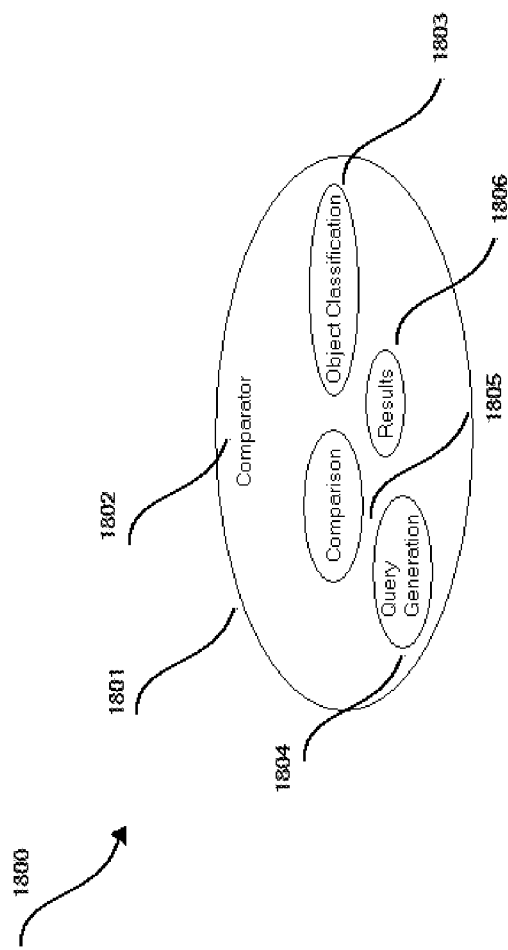
FIG. 18 represents the comparator process software organization within the advanced gameplay system.

Referring now to FIG. 18, system 1800 of the instant application not fully shown appears as a series of related software processes residing within the game console system for the purpose of processing comparisons using the comparator module 1801 and 1802 which contains an object classification module 1803, a query generation module 1804, a comparison module 1805 and a result module 1806. The object classification module 1803 may be used to classify motions and other objects for the purpose of comparisons. These classifications may be applied a different levels based on the types of results required by the system. For example, a jumping motion made by one or more players may be classified in the same category as one or more players making their hands jump. Using given inputs and settings, the comparison module, in this case, may show that the two motions, even though related to different bodily motions, may result in a comparative match if desired by the one or more players. The query generation module 1804 may be used to produce the necessary lower-level languages needed to produce a query against the data store. For example, a motion sequence may be a string of numeric values related to several edge points within several motion sequences; the query generation module 1804 could use this motion sequence data to generate one or more language statements which are used to search one or more databases for one or more results. The comparison module 1805 may be used to receive one or more data for the purpose of determining one or more matches iteratively until one or more requests are satisfied. For example, a comparison process may be given a game context, an array of one or more motion edge points, as well as other data. The comparison module 1805 may search for a match or comparison result across one or more systems using different means until a match, near match, a non-match, or an error occurs. The resulting output from the comparison module may be delivered to the result module 1806 which may be used to determine if the request has been satisfied. The result module 1806 may then deliver the results to other one or more modules, for example the rendering module, or reply to the comparison module 1804 that more information is needed or that the result was not good enough, etc.

Figure 19:
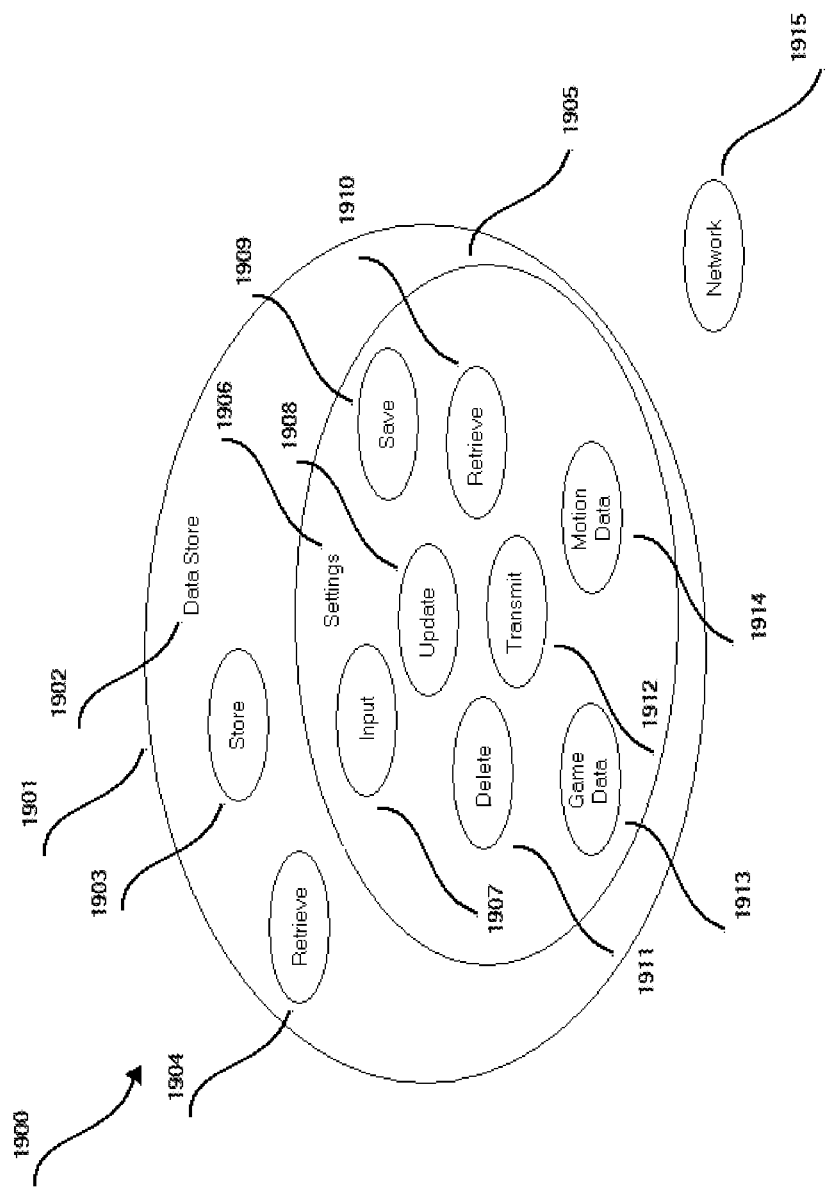
FIG. 19 represents the data store and settings process software organization within the advanced gameplay system.

Referring now to FIG. 19, system 1900 of the instant application not fully shown appears as a series of related software processes residing within the game console system for the purpose of processing the data storage mechanisms and network processes needed by the game system. The data store process 1901 and 1902 contain the store module 1903, the retrieve module 1904 as well as the settings module 1905 and 1906. The store module may be used by the data store process to save related information to the data store in the form of new data as well as updating which may need to be changed. The store module 1903 may also have the capacity to remove items from the system directed by the system, player, or otherwise. The retrieve module 1904 may have the responsibility to recover one or more datum from the data store based on full or partial requests made by the data store module 1902. The data stored and retrieved from the system may include motion edge points which are used, in turn, to apply resulting actions to one or more players' avatars. The settings module 1906 may relate to any and all settings stored, retrieved, updated or removed from the system. These settings may include any wide range of data including, but not limited to, the custom configurations made by the one or more players. The modules possibly accessed by the settings module 1906 may include the input module 1907, the update module 1908, the save module 1909, the retrieve module 1910, the delete module 1911, the transmit module 1912, the game data 1913 and the motion data 1914. The input module 1907 may receive input data to deliver, for example, to the save module 1909 or use for retrieving information from the settings portion of the data store through the retrieve module 1910, as well as others. The save module 1909 may be used to store information to the data store as well as reply to the calling module so that it knows that the data was saved. The save module 1909 may also possess responsibilities related directly to recovering if an error is found, for example. The update module 1908 may be used in relationship to saving changed information which may already exist in the data store as needed by the system. The delete module 1911 may be used to remove information stored on the data store. A removal of data may be directed by the one or more players, the system, or other means and could be performed in a restricted or unrestricted sense. The transmit module 1912 may be used to deliver or receive, for example, settings to or from a local or remote location across a network. Modules dealing with particular classifications of data may be processed using one or more of either of the game data module 1913 and/or the motion data module 1914. The game data module 1913, for example, may be used to only process information related to information needed for a specific game.

Figure 20:
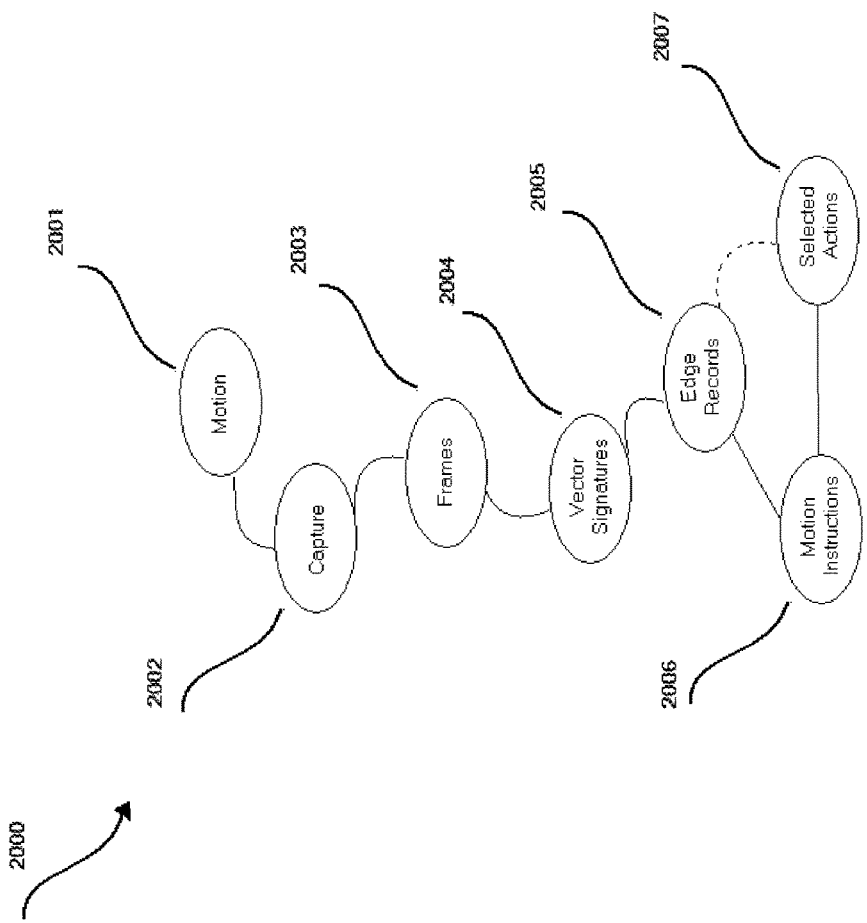
FIG. 20 represents the process by which motions are translated into motion instructions within the advanced gameplay system, referred to as motion quantization.

Referring now to FIG. 20, system 2000 of the instant application not fully shown appears as a series of related software processes residing within the game console system specifically for the purpose of converting one or more received motions into one or more motion instructions, referred to as motion quantization, where one or more motions 2001 are received by one or more capture units 2002 and transformed by the one or more capture units 2002 into one or more frames 2003. The one or more frames 2003 are converted to one or more vector signatures 2004 shown in FIG. 5 and further converted, possibly stored, as one or more edge records 2005 shown in FIG. 6. The one or more edge records 2005, coupled with the one or more selected actions 2007, may be used to produce one or more motion instructions 2006.

What is claimed is:

1. A method of interpreting a user motion sequence, the method comprising:
   capturing the user motion sequence as a plurality of images of a user body via a motion capturing device during a session;
   during the user motion sequence, identifying the user motion sequence has stopped responsive to identifying a lack of movement of the user body for a predefined period of time;
   responsive to the lack of movement of the user body, receiving the plurality of images and reducing user body position data of user arms and user legs to a plurality of data points;
   identifying position changes of the user arms and the user legs based on the plurality of data points in each of the plurality of images;
   processing, via a processor, the user motion sequence into a predetermined data format comprising a plurality of vector signatures;
   comparing the processed user motion sequence to at least one predetermined motion sequence stored in a database comprising pre-stored vector signatures, by comparing the plurality of data points of the vector signatures of the user motion sequence to a plurality of data points of the pre-stored vector signatures to determine whether there is a match;
   determining whether to perform at least one of interpreting the user motion sequence as a universal command and registering the user motion sequence as a new command;
   identifying the user motion sequence as not having a match in the database responsive to the comparing of the vector signature of the user motion sequence to the pre-stored vector signatures; and registering the user motion sequence as a new command when the user motion sequence was not discovered in the database.

2. The method of claim 1, wherein the motion capturing device comprises at least one of a camera and a motion detector.

3. The method of claim 1, wherein the determining whether to perform at least one of interpreting the user motion sequence as a universal command and registering the user motion sequence as a new command further comprises interpreting the user motion sequence as a universal command if the user motion sequence was discovered in the database based on the comparing operation.

4. The method of claim 1, wherein the user motion sequence is processed into the predetermined data format comprising the plurality of vector signatures by converting each image into a corresponding set of vector signatures each comprising lines which join the plurality of data points defining a position of the user body.

5. The method of claim 1, wherein the registering the user motion sequence as the new command further comprises prompting the user to register the user motion sequence and receiving a response from the user confirming the decision to register the user motion sequence as the new command.

6. The method of claim 5, further comprising:
determining the significance of the user motion sequence;
creating a motion significance packet comprising a command type associated with the user motion sequence and a corresponding avatar action to be performed by an avatar associated with the user motion sequence; and
transferring the motion significance packet to a motion processing module.

7. The method of claim 6, further comprising determining whether to perform at least one of registering the new command as a universally available command that may be used by more than one video game and registering the command as a non-universal command that is specifically designated for one video game, and wherein the registration determination is based on a type of movement associated with the user motion sequence.

8. An apparatus configured to interpret a user motion sequence, the apparatus comprising:
a motion capturing device configured to capture the user motion sequence as a plurality of images of a user body during a session; and
a processor configured to
during the user motion sequence, identify the user motion sequence has stopped responsive to an identification of a lack of movement of the user body for a predefined period of time;
responsive to the lack of movement of the user body, receive the plurality of images and reduce user body position data of user arms and user legs to a plurality of data points;
receive a session begin command,
identify position changes of the user arms and the user legs based on the plurality of data points in each of the plurality of images;
process the user motion sequence into a predetermined data format comprising a plurality of vector signatures,
compare the processed user motion sequence to at least one predetermined motion sequence stored in a database comprising pre-stored vector signatures, by a comparison of the plurality of data points of the vector signatures of the user motion sequence to a plurality of data points of the pre-stored vector signatures to determine whether there is a match,
determine whether to perform at least one of interpret the user motion sequence as a universal command and register the user motion sequence as a new command,
identify the user motion sequence as not having a match in the database responsive to the comparison of the vector signature of the user motion sequence to the pre-stored vector signatures, and
register the user motion sequence as a new command when the user motion sequence was not discovered in the database.

9. The apparatus of claim 8, wherein the motion capturing device comprises at least one of a camera and a motion detector.

10. The apparatus of claim 8, wherein the processor is further configured to interpret the user motion sequence as a universal command if the user motion sequence was discovered in the database based on the comparison operation.

11. The apparatus of claim 8, wherein the processor is further configured to convert each image into a corresponding set of vector signatures each comprising lines which join the plurality of data points that define a position of the user body when the user motion sequence is processed into the predetermined data format.

12. The apparatus of claim 8, wherein the processor is further configured to prompt the user to register the user motion sequence and receive a response from the user that confirms the decision to register the user motion sequence as the new command.

13. The apparatus of claim 12, wherein the processor is further configured to determine the significance of the user motion sequence, and create a motion significance packet comprising a command type associated with the user motion sequence and a corresponding avatar action to be performed by an avatar associated with the user motion sequence, and transfer the motion significance packet to a motion processing module.

14. The apparatus of claim 13, wherein the processor is further configured to determine whether to perform at least one of register the new command as a universally available command that may be used by more than one video game and register the command as a non-universal command that is specifically designated for one video game, and wherein the registration determination is based on a type of movement associated with the user motion sequence.

15. A non-transitory computer readable storage medium configured to store instructions that when executed cause a processor to perform interpreting a user motion sequence, the processor being further configured to perform:
capturing the user motion sequence as a plurality of images of a user body via a motion capturing device during a session;
during the user motion sequence, identifying the user motion sequence has stopped responsive to identifying a lack of movement of the user body for a predefined period of time;
responsive to the lack of movement of the user body, receiving the plurality of images and reducing user body position data of user arms and user legs to a plurality of data points;
identifying position changes of the user arms and the user legs based on the plurality of data points in each of the plurality of images;
processing, via a processor, the user motion sequence into a predetermined data format comprising a plurality of vector signatures;

comparing the processed user motion sequence to at least one predetermined motion sequence stored in a database comprising pre-stored vector signatures, by comparing the plurality of data points of the vector signatures of the user motion sequence to a plurality of data points of the pre-stored vector signatures to determine whether there is a match;

determining whether to perform at least one of interpreting the user motion sequence as a universal command and registering the user motion sequence as a new command;

identifying the user motion sequence as not having a match in the database responsive to the comparing of the vector signature of the user motion sequence to the pre-stored vector signatures; and registering the user motion sequence as a new command when the user motion sequence was not discovered in the database.

16. The non-transitory computer readable storage medium of claim 15, wherein the motion capturing device comprises at least one of a camera and a motion detector.

17. The non-transitory computer readable storage medium of claim 15, wherein the determining whether to perform at least one of interpreting the user motion sequence as a universal command and registering the user motion sequence as a new command further comprises interpreting the user motion sequence as a universal command if the user motion sequence was discovered in the database based on the comparing operation.

18. The non-transitory computer readable storage medium of claim 15, wherein the user motion sequence is processed into the predetermined data format comprising the plurality of vector signatures by converting each image into a corresponding set of vector signatures each comprising lines which join the plurality of data points defining a position of the user body.

19. The non-transitory computer readable storage medium of claim 15, wherein the registering the user motion sequence as the new command further comprises prompting the user to register the user motion sequence and receiving a response from the user confirming the decision to register the user motion sequence as the new command.

20. The non-transitory computer readable storage medium of claim 19, wherein the processor is further configured to perform:

determining the significance of the user motion sequence;

creating a motion significance packet comprising a command type associated with the user motion sequence and a corresponding avatar action to be performed by an avatar associated with the user motion sequence; and transferring the motion significance packet to a motion processing module.

* * * * *